US011908202B2

(12) United States Patent
Lee et al.

(10) Patent No.: US 11,908,202 B2
(45) Date of Patent: Feb. 20, 2024

(54) METHOD AND SYSTEM OF USING A GLOBAL TRANSFORMER FOR EFFICIENT MODELING OF GLOBAL CONTEXT IN POINT CLOUDS

(71) Applicant: GM CRUISE HOLDINGS LLC, San Francisco, CA (US)

(72) Inventors: Yong Jae Lee, Walnut Creek, CA (US); Haotian Liu, Madison, WI (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/560,676

(22) Filed: Dec. 23, 2021

(65) Prior Publication Data

US 2023/0206645 A1    Jun. 29, 2023

(51) Int. Cl.
*G06V 20/58*     (2022.01)
*G06V 10/44*     (2022.01)
*G06V 10/42*     (2022.01)
*G06V 20/64*     (2022.01)

(52) U.S. Cl.
CPC .............. *G06V 20/58* (2022.01); *G06V 10/42* (2022.01); *G06V 10/44* (2022.01); *G06V 20/64* (2022.01)

(58) Field of Classification Search
USPC ......................... 382/103, 155–156, 159, 173
See application file for complete search history.

(56) References Cited

U.S. PATENT DOCUMENTS

| 2022/0198254 | A1* | 6/2022 | Dalli ........................ G06N 5/01 |
| 2023/0035475 | A1* | 2/2023 | Cheng .................. G01S 17/931 |
| 2023/0095182 | A1* | 3/2023 | Yao ........................... G06T 3/40 |
| | | | 382/115 |
| 2023/0145535 | A1* | 5/2023 | Hatamizadeh ........... G06N 3/02 |
| | | | 514/460 |
| 2023/0290135 | A1* | 9/2023 | Zhou .................. G06V 10/7715 |
| | | | 382/156 |

OTHER PUBLICATIONS

X. Pan, Z. Xia, S. Song, L. E. Li and G. Huang, "3D Object Detection with Pointformer," 2021 IEEE/CVF Conference on Computer Vision and Pattern Recognition (CVPR), Nashville, TN, USA, 2021, pp. 7459-7468, doi: 10.1109/CVPR46437.2021.00738. (Year: 2021).*

(Continued)

*Primary Examiner* — Ishrat I Sherali
(74) *Attorney, Agent, or Firm* — Jaffery Watson Memdonsa & Hamilton LLP

(57) ABSTRACT

For one embodiment of the present invention, a method of object detection and part segmentation is described. The method includes generating a three-dimensional (3D) point cloud including a plurality of points in a volume of a space of the point cloud based on receiving point cloud dat. The method further includes obtaining, with a global transformer, a set of global feature tokens and local feature points of the 3D point cloud, enforcing with an attention mechanism information flow across the set of global feature tokens and local feature point, and generating, with the global transformer, a set of new global feature tokens and new local feature points with modeled global context information.

20 Claims, 11 Drawing Sheets

(56) References Cited

OTHER PUBLICATIONS

R. Q. Charles, H. Su, M. Kaichun and L. J. Guibas, "PointNet: Deep Learning on Point Sets for 3D Classification and Segmentation," 2017 IEEE Conference on Computer Vision and Pattern Recognition (CVPR), Honolulu, HI, USA, 2017, pp. 77-85, doi: 10.1109/CVPR.2017.16 (Year: 2017).*
Wang et al., Separable Self-Attention Mechanism for Point Cloud Local and Global Feature Modeling, IEEE Access, vol. 10, Digital Object Identifier 10.1109/ACCESS.2022.3228044., pp. 1-9. (Year: 2022).*
Guo et al., CT-Block a Novel Local and Global Features Extractor for Point Cloud, arXiv:2111.15400v1 [cs.CV], Nov. 30, 2021, pp. 1-15. (Year: 2021).*
David Acuna, Huan Ling, Amlan Kar, and Sanja Fidler. Ef-ficient interactive annotation of segmentation datasets with polygon-rnn++. In Proceedings of the IEEE conference on Computer Vision and Pattern Recognition, pp. 859-868, 2018.
Pablo Arbelaez, Michael Maire, Charless Fowlkes, and Ji-tendra Malik. Contour detection and hierarchical image seg-mentation. IEEE transactions on pattern analysis and machine intelligence, 33(5):898-916, 2010.
Iz Beltagy, Matthew E Peters, and Arman Cohan. Long-former: The long-document transformer. arXiv preprint arXiv:2004.05150, 2020.
Daniel Bolya, Chong Zhou, Fanyi Xiao, and Yong Jae Lee. Yolact: Real-time instance segmentation. In Proceedings of the IEEE/CVF International Conference on Computer Vi-sion, pp. 9157-9166, 2019.
John Canny. A computational approach to edge detection. IEEE Transactions on pattern analysis and machine intelli-gence, (6):679-698, 1986.
Nicolas Carion, Francisco Massa, Gabriel Synnaeve, Nicolas Usunier, Alexander Kirillov, and Sergey Zagoruyko. End-to-end object detection with transformers. In European Confer-ence on Computer Vision, pp. 213-229. Springer, 2020.
Lluis Castrejon, Kaustav Kundu, Raquel Urtasun, and Sanja Fidler. Annotating object instances with a polygon-rnn. In Proceedings of the IEEE conference on computer vision and pattern recognition, pp. 5230-5238, 2017.
Ting Chen, Saurabh Saxena, Lala Li, David J Fleet, and Ge-offrey Hinton. Pix2seq: A language modeling framework for object detection. arXiv preprint arXiv:2109.10852, 2021.
Bowen Cheng, Ross Girshick, Piotr Doll'ar, Alexander C Berg, and Alexander Kirillov. Boundary iou: Improving object-centric image segmentation evaluation. In Proceed-ings of the IEEE/CVF Conference on Computer Vision and Pattern Recognition, pp. 15334-15342, 2021.
Bowen Cheng, Alexander G Schwing, and Alexander Kir-illov. Per-pixel classification is not all you need for semantic segmentation. arXiv preprint arXiv:2107.06278, 2021.
Tianheng Cheng, Xinggang Wang, Lichao Huang, and Wenyu Liu. Boundary-preserving mask r-cnn. In European conference on computer vision, pp. 660-676. Springer, 2020.
Jifeng Dai, Kaiming He, and Jian Sun. Convolutional feature masking for joint object and stuff segmentation. In Proceedings of the IEEE conference on computer vision and pattern recognition, pp. 3992-4000, 2015.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Syl-vain Gelly, et al. An image is worth 16x16 words: Trans-formers for image recognition at scale. arXiv preprint arXiv:2010.11929, 2020.
Peng Gao, Minghang Zheng, Xiaogang Wang, Jifeng Dai, and Hongsheng Li. Fast convergence of detr with spatially modulated co-attention. arXiv preprint arXiv:2101.07448, 2021.
Ross Girshick. Fast r-cnn. In Proceedings of the IEEE inter-national conference on computer vision, pp. 1440-1448, 2015.
Ross Girshick, Jeff Donahue, Trevor Darrell, and Jitendra Malik. Rich feature hierarchies for accurate object detection and semantic segmentation. In Proceedings of the IEEE con-ference on computer vision and pattern recognition, pp. 580-587, 2014.
Agrim Gupta, Piotr Dollar, and Ross Girshick. Lvis: A dataset for large vocabulary instance segmentation. In Pro-ceedings of the IEEE/CVF Conference on Computer Vision and Pattern Recognition, pp. 5356-5364, 2019.
Bharath Hariharan, Pablo Arbel'aez, Ross Girshick, and Ji-tendra Malik. Simultaneous detection and segmentation. In European conference on computer vision, pp. 297-312. Springer, 2014.
Bharath Hariharan, Pablo Arbel'aez, Ross Girshick, and Ji-tendra Malik. Hypercolumns for object segmentation and fine-grained localization. In Proceedings of the IEEE con-ference on computer vision and pattern recognition, pp. 447-456, 2015.
Kaiming He, Georgia Gkioxari, Piotr Doll'ar, and Ross Gir-shick. Mask r-cnn. In Proceedings of the IEEE international conference on computer vision, pp. 2961-2969, 2017.
Kaiming He, Xiangyu Zhang, Shaoqing Ren, and Jian Sun. Spatial pyramid pooling in deep convolutional networks for visual recognition. IEEE transactions on pattern analysis and machine intelligence, 37(9):1904-1916, 2015.
Kaiming He, Xiangyu Zhang, Shaoqing Ren, and Jian Sun. Deep residual learning for image recognition. In Proceed-ings of the IEEE conference on computer vision and pattern recognition, pp. 770-778, 2016.
Jie Hu, Liujuan Cao, Yao Lu, ShengChuan Zhang, Yan Wang, Ke Li, Feiyue Huang, Ling Shao, and Rongrong Ji. Istr: End-to-end instance segmentation with transformers. arXiv preprint arXiv:2105.00637, 2021.
Zhaojin Huang, Lichao Huang, Yongchao Gong, Chang Huang, and Xinggang Wang. Mask scoring r-cnn. In Pro-ceedings of the IEEE/CVF Conference on Computer Vision and Pattern Recognition, pp. 6409-6418, 2019.
Yifan Jiang, S Chang, and Z Wang. Transgan: Two pure transformers can make one strong gan, and that can scale up. CVPR, 2021.
Alexander Kirillov, Yuxin Wu, Kaiming He, and Ross Gir-shick. Pointrend: Image segmentation as rendering. In Pro-ceedings of the IEEE/CVF conference on computer vision and pattern recognition, pp. 9799-9808, 2020.
Nikita Kitaev, Łukasz Kaiser, and Anselm Levskaya. Reformer: The efficient transformer. arXiv preprint arXiv:2001.04451, 2020.
Josef Kittler. On the accuracy of the sobel edge detector. Image and Vision Computing, 1(1):37-42, 1983.
Scott Konishi, Alan L. Yuille, James M. Coughlan, and Song Chun Zhu. Statistical edge detection: Learning and evaluating edge cues. IEEE Transactions on Pattern Analy-sis and Machine Intelligence, 25(1):57-74, 2003.
Hei Law and Jia Deng. Cornernet: Detecting objects as paired keypoints. In Proceedings of the European confer-ence on computer vision (ECCV), pp. 734-750, 2018.
Justin Liang, Namdar Homayounfar, Wei-Chiu Ma, Yuwen Xiong, Rui Hu, and Raquel Urtasun. Polytransform: Deep polygon transformer for instance segmentation. In Proceed-ings of the IEEE/CVF Conference on Computer Vision and Pattern Recognition, pp. 9131-9140, 2020.
Tsung-Yi Lin, Piotr Doll'ar, Ross Girshick, Kaiming He, Bharath Hariharan, and Serge Belongie. Feature pyramid networks for object detection. In Proceedings of the IEEE conference on computer vision and pattern recognition, pp. 2117-2125, 2017.
Tsung-Yi Lin, Priya Goyal, Ross Girshick, Kaiming He, and Piotr Dollar. Focal loss for dense object detection. In Pro-ceedings of the IEEE international conference on computer vision, pp. 2980-2988, 2017.
Tsung-Yi Lin, Michael Maire, Serge Belongie, James Hays, Pietro Perona, Deva Ramanan, Piotr Doll'ar, and C Lawrence Zitnick. Microsoft coco: Common objects in context. In ECCV, 2014.
Liyuan Liu, Xiaodong Liu, Jianfeng Gao, Weizhu Chen, and Jiawei Han. Understanding the difficulty of training trans-formers. arXiv preprint arXiv:2004.08249, 2020.
Yun Liu, Ming-Ming Cheng, Xiaowei Hu, Kai Wang, and Xiang Bai. Richer convolutional features for edge detection. In Proceed-ings of the IEEE conference on computer vision and pattern recognition, pp. 3000-3009, 2017.

(56) References Cited

OTHER PUBLICATIONS

Ze Liu, Yutong Lin, Yue Cao, Han Hu, Yixuan Wei, Zheng Zhang, Stephen Lin, and Baining Guo. Swin trans-former: Hierarchical vision transformer using shifted win-dows. arXiv preprint arXiv:2103.14030, 2021.

Jonathan Long, Evan Shelhamer, and Trevor Darrell. Fully convolutional networks for semantic segmentation. In Pro-ceedings of the IEEE conference on computer vision and pat-tern recognition, pp. 3431-3440, 2015.

David Marr and Ellen Hildreth. Theory of edge detection. Proceedings of the Royal Society of London. Series B. Bio-logical Sciences, 207(1167):187-217, 1980.

David R Martin, Charless C Fowlkes, and Jitendra Ma-lik. Learning to detect natural image boundaries using lo-cal brightness, color, and texture cues. IEEE transactions on pattern analysis and machine intelligence, 26(5):530-549, 2004.

Depu Meng, Xiaokang Chen, Zejia Fan, Gang Zeng, Houqiang Li, Yuhui Yuan, Lei Sun, and Jingdong Wang. Conditional detr for fast training convergence. In Proceed-ings of the IEEE/CVF International Conference on Com-puter Vision, pp. 3651-3660, 2021.

Fausto Milletari, Nassir Navab, and Seyed-Ahmad Ahmadi. V-net: Fully convolutional neural networks for volumetric medical image segmentation. In 2016 fourth international conference on 3D vision (3DV), pp. 565-571. IEEE, 2016.

Sida Peng, Wen Jiang, Huaijin Pi, Xiuli Li, Hujun Bao, and Xiaowei Zhou. Deep snake for real-time instance seg-mentation. In Proceedings of the IEEE/CVF Conference on Computer Vision and Pattern Recognition, pp. 8533-8542, 2020.

Shaoqing Ren, Kaiming He, Ross Girshick, and Jian Sun. Faster r-cnn: Towards real-time object detection with region proposal networks. Advances in neural information process-ing systems, 28:91-99, 2015.

Hamid Rezatofighi, Nathan Tsoi, JunYoung Gwak, Amir Sadeghian, Ian Reid, and Silvio Savarese. Generalized in-tersection over union: A metric and a loss for bounding box regression. In Proceedings of the IEEE/CVF Conference on Computer Vision and Pattern Rec-ognition, pp. 658-666, 2019.

Robin Strudel, Ricardo Garcia, Ivan Laptev, and Cordelia Schmid. Segmenter: Transformer for semantic segmenta-tion. arXiv preprint arXiv:2105.05633, 2021.

Ian Tenney, Dipanjan Das, and Ellie Pavlick. Bert rediscovers the classical nlp pipeline. arXiv preprint arXiv:1905.05950, 2019.

Zhi Tian, Chunhua Shen, and Hao Chen. Conditional con-volutions for instance segmentation. In Computer Vision—ECCV 2020: 16th European Conference, Glasgow, UK, Aug. 23-28, 2020, Proceedings, Part I 16, pp. 282-298. Springer, 2020.

Vincent Torre and Tomaso A Poggio. On edge detection. IEEE Transactions on Pattern Analysis and Machine Intelli-gence, (2):147-163, 1986.

Ashish Vaswani, Noam Shazeer, Niki Parmar, Jakob Uszko-reit, Llion Jones, Aidan N Gomez, Łukasz Kaiser, and Illia Polosukhin. Attention is all you need. In Advances in neural information processing systems, pp. 5998-6008, 2017.

Chun-Fu Chen, Quanfu Fan, and Rameswar Panda. Crossvit: Cross-attention multi-scale vision transformer for image classification. arXiv preprint arXiv:2103.14899, 2021.

Rewon Child, Scott Gray, Alec Radford, and Ilya Sutskever. Generating long sequences with sparse transformers. arXiv preprint arXiv:1904.10509, 2019.

Christopher Choy, JunYoung Gwak, and Silvio Savarese. 4d spatio-temporal convnets: Minkowski convolutional neu-al networks. In Proceedings of the IEEE/CVF Conference on Computer Vision and Pattern Recognition, pp. 3075-3084, 2019.

Nico Engel, Vasileios Belagiannis, and Klaus Dietmayer. Point transformer. IEEE Access, 2021.

Matheus Gadelha, Rui Wang, and Subhransu Maji. Multires-olution tree networks for 3d point cloud processing. In Pro-ceedings of the European Conference on Computer Vision (ECCV), pp. 103-118, 2018.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. Advances in neural information processing systems, 27, 2014.

Meng-Hao Guo, Jun-Xiong Cai, Zheng-Ning Liu, Tai-Jiang Mu, Ralph R Martin, and Shi-Min Hu. Pct: Point cloud transformer. Computational Visual Media, 7(2):187-199, 2021.

Andrew Jaegle, Felix Gimeno, Andrew Brock, Andrew Zis-serman, Oriol Vinyals, and Joao Carreira. Perceiver: Gen-eral perception with iterative attention. arXiv preprint arXiv:2103.03206, 2021.

Artem Komarichev, Zichun Zhong, and Jing Hua. A-cnn: Annularly convolutional neural networks on point clouds. In Proceedings of the IEEE/CVF Conference on Computer Vi-sion and Pattern Recognition, pp. 7421-7430, 2019.

Shiyi Lan, Ruichi Yu, Gang Yu, and Larry S Davis. Modeling local geometric structure of 3d point clouds using geo-cnn. In Proceedings of the IEEE/CVF Conference on Computer Vision and Pattern Recognition, pp. 998-1008, 2019.

Guohao Li, Matthias Muller, Ali Thabet, and Bernard Ghanem. Deepgcns: Can gcns go as deep as cnns? In Proceedings of the IEEE/CVF International Conference on Computer Vision, pp. 9267-9276, 2019.

Yangyan Li, Rui Bu, Mingchao Sun, Wei Wu, Xinhan Di, and Baoquan Chen. Pointcnn: Convolution on x-transformed points. Advances in neural information processing systems, 31:820-830, 2018.

Yongcheng Liu, Bin Fan, Gaofeng Meng, Jiwen Lu, Shiming Xiang, and Chunhong Pan. Densepoint: Learning densely contextual representation for efficient point cloud process-ing. In Proceedings of the IEEE/CVF International Confer-ence on Computer Vision, pp. 5239-5248, 2019.

Ze Liu, Han Hu, Yue Cao, Zheng Zhang, and Xin Tong. A closer look at local aggregation operators in point cloud anal-ysis. In CVPR, pp. 326-342. Springer, 2020.

Daniel Maturana and Sebastian Scherer. Voxnet: A 3d con-volutional neural network for real-time object recognition. In 2015 IEEE/RSJ International Conference on Intelligent Robots and Sys-tems (IROS), pp. 922-928. IEEE, 2015.

Ishan Misra, Rohit Girdhar, and Armand Joulin. An end-to-end transformer model for 3d object detection. In Proceed-ings of the IEEE/CVF International Conference on Com-puter Vision, pp. 2906-2917, 2021.

Kaichun Mo, Shilin Zhu, Angel X Chang, Li Yi, Subarna Tripathi, Leonidas J Guibas, and Hao Su. Partnet: A large-scale benchmark for fine-grained and hierarchical part-level 3d object understanding. In Proceedings of the IEEE/CVF Conference on Computer Vision and Pattern Recognition, pp. 909-918, 2019.

Xuran Pan, Zhuofan Xia, Shiji Song, Li Erran Li, and Gao Huang. 3d object detection with pointformer. In Proceed-ings of the IEEE/CVF Conference on Computer Vision and Pattern Recognition, pp. 7463-7472, 2021.

Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An im-perative style, high-performance deep learning library. Ad-vances in neural information processing systems, 32:8026-8037, 2019.

Charles R Qi, Hao Su, Kaichun Mo, and Leonidas J Guibas. Pointnet: Deep learning on point sets for 3d classification and segmentation. In Proceedings of the IEEE conference on computer vision and pattern recognition, pp. 652-660, 2017.

Charles R Qi, Li Yi, Hao Su, and Leonidas J Guibas. Point-net++: Deep hierarchical feature learning on point sets in a metric space. arXiv preprint arXiv:1706.02413, 2017.

Jiezhong Qiu, Hao Ma, Omer Levy, Scott Wen-tau Yih, Sinong Wang, and Jie Tang. Blockwise self-attention for long document understanding. arXiv preprint arXiv:1911.02972, 2019.

Gernot Riegler, Ali Osman Ulusoy, and Andreas Geiger. Octnet: Learning deep 3d representations at high resolutions. In Proceed-ings of the IEEE conference on computer vision and pattern recognition, pp. 3577-3586, 2017.

Hang Su, Varun Jampani, Deqing Sun, Subhransu Maji, Evangelos Kalogerakis, Ming-Hsuan Yang, and Jan Kautz. Splatnet: Sparse

(56) References Cited

OTHER PUBLICATIONS lattice networks for point cloud processing. In Proceedings of the IEEE conference on computer vision and pattern recognition, pp. 2530-2539, 2018.

Christian Szegedy, Vincent Vanhoucke, Sergey Ioffe, Jon Shlens, and Zbigniew Wojna. Rethinking the inception archi-tecture for computer vision. In Proceedings of the IEEE con-ference on computer vision and pattern recognition, pp. 2818-2826, 2016.

Matthew Tancik, Pratul P Srinivasan, Ben Mildenhall, Sara Fridovich-Keil, Nithin Raghavan, Utkarsh Singhal, Ravi Ra-mamoorthi, Jonathan T Barron, and Ren Ng. Fourier features let networks learn high frequency functions in low dimen-sional domains. arXiv preprint arXiv:2006.10739, 2020.

Hugues Thomas, Charles R Qi, Jean-Emmanuel Deschaud, Beatriz Marcotegui, Francois Goulette, and Leonidas J Guibas. Kpconv: Flexible and deformable convolution for point clouds. In Proceedings of the IEEE/CVF International Conference on Computer Vision, pp. 6411-6420, 2019.

Sinong Wang, Belinda Z Li, Madian Khabsa, Han Fang, and Hao Ma. Linformer: Self-attention with linear complexity. arXiv preprint arXiv:2006.04768, 2020.

Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without convolutions. arXiv preprint arXiv:2102.12122, 2021.

Yue Wang, Yongbin Sun, Ziwei Liu, Sanjay E Sarma, Michael M Bronstein, and Justin M Solomon. Dynamic graph cnn for learning on point clouds. Acm Transactions On Graphics (tog), 38(5):1-12, 2019.

Yuqing Wang, Zhaoliang Xu, Xinlong Wang, Chunhua Shen, Baoshan Cheng, Hao Shen, and Huaxia Xia. End-to-end video instance segmentation with transformers. In Proceed-ings of the IEEE/CVF Conference on Computer Vision and Pattern Recognition, pp. 8741-8750, 2021.

Zhirong Wu, Shuran Song, Aditya Khosla, Fisher Yu, Lin-guang Zhang, Xiaoou Tang, and Jianxiong Xiao. 3d shapenets: A deep representation for volumetric shapes. In Proceedings of the IEEE conference on computer vision and pattern recognition, pp. 1912-1920, 2015.

Enze Xie, Wenhai Wang, Zhiding Yu, Anima Anandkumar, Jose M Alvarez, and Ping Luo. Segformer: Simple and ef-ficient design for semantic segmentation with transformers. arXiv preprint arXiv:2105.15203, 2021.

Mutian Xu, Runyu Ding, Hengshuang Zhao, and Xiao-juan Qi. Paconv: Position adaptive convolution with dy-namic kernel assembling on point clouds. In Proceedings of the IEEE/CVF Conference on Computer Vision and Pattern Recognition, pp. 3173-3182, 2021.

Li Yi, Vladimir G Kim, Duygu Ceylan, I-Chao Shen, Mengyan Yan, Hao Su, Cewu Lu, Qixing Huang, Alla Shef-fer, and Leonidas Guibas. A scalable active framework for region annotation in 3d shape collections. ACM Transactions on Graphics (ToG), 35(6):1-12, 2016.

Pengchuan Zhang, Xiyang Dai, Jianwei Yang, Bin Xiao, Lu Yuan, Lei Zhang, and Jianfeng Gao. Multi-scale vision long-former: A new vision transformer for high-resolution image encoding. arXiv preprint arXiv:2103.15358, 2021.

Hengshuang Zhao, Li Jiang, Chi-Wing Fu, and Jiaya Jia. Pointweb: Enhancing local neighborhood features for point cloud processing. In Proceedings of the IEEE/CVF Con-ference on Computer Vision and Pattern Recognition, pp. 5565-5573, 2019.

Hengshuang Zhao, Li Jiang, Jiaya Jia, Philip HS Torr, and Vladlen Koltun. Point transformer. In Proceedings of the IEEE/CVF International Conference on Computer Vision, pp. 16259-16268, 2021.

Sixiao Zheng, Jiachen Lu, Hengshuang Zhao, Xiatian Zhu, Zekun Luo, Yabiao Wang, Yanwei Fu, Jianfeng Feng, Tao Xiang, Philip HS Torr, et al. Rethinking semantic seg-mentation from a sequence-to-sequence perspective with transformers. In Proceedings of the IEEE/CVF Conference on Computer Vision and Pattern Recognition, pp. 6881-6890, 2021.

Xizhou Zhu, Weijie Su, Lewei Lu, Bin Li, Xiaogang Wang, and Jifeng Dai. Deformable detr: Deformable trans-formers for end-to-end object detection. arXiv preprint arXiv:2010.04159, 2020.

Huiyu Wang, Yukun Zhu, Hartwig Adam, Alan Yuille, and Liang-Chieh Chen. Max-deeplab: End-to-end panoptic segmentation with mask transformers. In Proceedings of the IEEE/CVF Conference on Computer Vision and Pattern Recognition, pp. 5463-5474, 2021.

Yuxin Wu and Kaiming He. Group normalization. In Pro-ceedings of the European conference on computer vision (ECCV), pp. 3-19, 2018.

Yuxin Wu, Alexander Kirillov, Francisco Massa, Wan-Yen Lo, and Ross Girshick. Detectron2. https://github. com/facebookresearch/detectron2, 2019.

Enze Xie, Peize Sun, Xiaoge Song, Wenhai Wang, Xuebo Liu, Ding Liang, Chunhua Shen, and Ping Luo. Polarmask: Single shot instance segmentation with polar representation. In Proceedings of the IEEE/CVF conference on computer vi-sion and pattern recognition, pp. 12193-12202, 2020.

Saining Xie and Zhuowen Tu. Holistically-nested edge de-tection. In Proceedings of the IEEE international conference on computer vision, pp. 1395-1403, 2015.

Zhiding Yu, Chen Feng, Ming-Yu Liu, and Srikumar Rama-lingam. Casenet: Deep category-aware semantic edge detec-tion. In Proceedings of the IEEE conference on computer vision and pattern recognition, pp. 5964-5973, 2017.

Zhiding Yu, Weiyang Liu, Yang Zou, Chen Feng, Srikumar Ramalingam, BVK Kumar, and Jan Kautz. Simultaneous edge alignment and learning. In Proceedings of the Euro-pean Conference on Computer Vision (ECCV), pp. 388-404, 2018.

Manzil Zaheer, Guru Guruganesh, Kumar Avinava Dubey, Joshua Ainslie, Chris Alberti, Santiago Ontanon, Philip Pham, Anirudh Ravula, Qifan Wang, Li Yang, et al. Big bird: Transformers for longer sequences. In NeurIPS, 2020.

Vaswani, Ashish et al., "Attention is All You Need", 31st Confer-ence on Neural Informatio Processing Systems (NIPS 2017), Long Beach, CA, US, 11 pages.

Cheng, Tianheng et al., "Boundary-preserving Mask R-CNN", Huazhong University of Science and Technology, arXiv:2007.08921v1 [cs.CV], Jul. 17, 2020, 17 pages.

Carion, Nicolas et al., "End-to-End Object Detection with Trans-formers", Facebook AI, arXiv:2005.12872v3 [cs.CV], May 28, 2020, 26 pages.

He, Kaiming et al., "Deep Residual Learning for Image Recogni-tion", Microsoft Research, 9 pages.

Zou, Yingtian et al., "Panoptic Edge Detection", arXiv:1906.00590v1 [cs.CV], Jun. 3, 2019, 14 pages.

Dong, Bin et al., "SOLQ: Segmenting Objects by Learning Que-ries", arXiv:2106.02351v3 [cs.CV] Sep. 30, 2021, 15 pages.

Restriction Requirement for U.S. Appl. No. 17/560,679, dated Dec. 8, 2023, 6 pages, USPTO.

\* cited by examiner

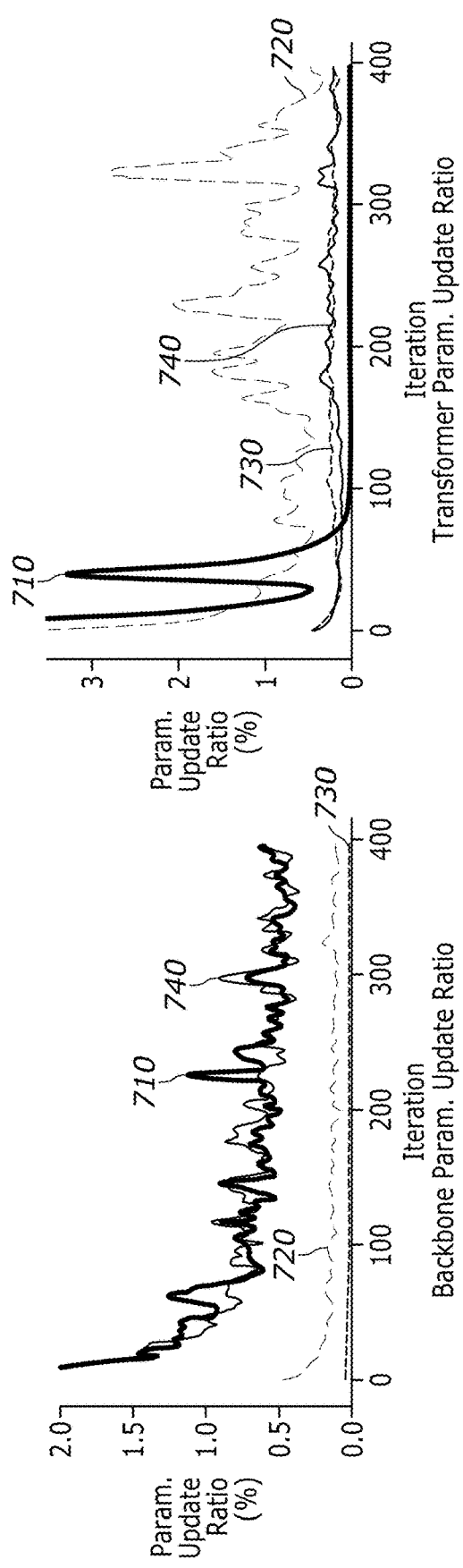
FIG. 7A
FIG. 7B
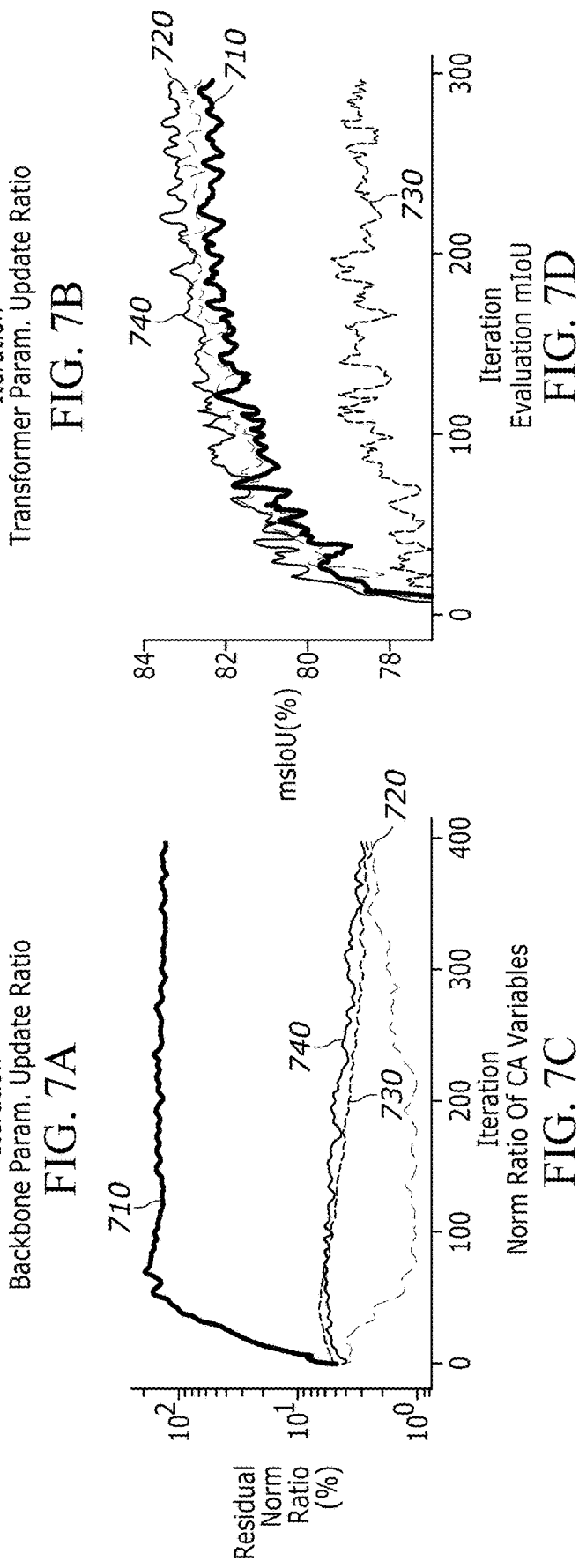
FIG. 7C
FIG. 7D

METHOD AND SYSTEM OF USING A GLOBAL TRANSFORMER FOR EFFICIENT MODELING OF GLOBAL CONTEXT IN POINT CLOUDS

TECHNICAL FIELD

Embodiments described herein generally relate to the fields of data processing and machine learning, and more particularly relates to a method and system of using a global transformer for efficient modeling of global context in point clouds.

BACKGROUND

With recent advances in three dimensional (3D) scanning technology, point cloud data has become a common input modality for many vision applications, including autonomous driving, robot navigation, etc. While convolutional networks (convnets) have led to great success for image-based tasks, the convnets cannot be directly adopted to point cloud data due to the disparity in how the data is organized—structured, regular, and dense 2D grids for images versus unstructured, irregular, and sparse 3D points for point clouds.

SUMMARY

For one embodiment of the present invention, a computer implemented method of object detection and part segmentation is described. The computer implemented method includes receiving point cloud data, generating a three-dimensional (3D) point cloud including a plurality of points in a volume of a space of the point cloud. The method further includes obtaining, with a global transformer, a set of global feature tokens and local feature points of the 3D point cloud, enforcing with an attention mechanism information flow across the set of global feature tokens and local feature points, and generating, with the global transformer, a set of new global feature tokens and new local feature points with modeled global context information.

Other features and advantages of embodiments of the present invention will be apparent from the accompanying drawings and from the detailed description that follows below.

BRIEF DESCRIPTION OF THE DRAWINGS

FIGS. 7A, 7B, 7C, and 7D show training analysis with large, medium, small, and decoupled learning rate (LR).

DETAILED DESCRIPTION OF EMBODIMENTS

Figure 1:
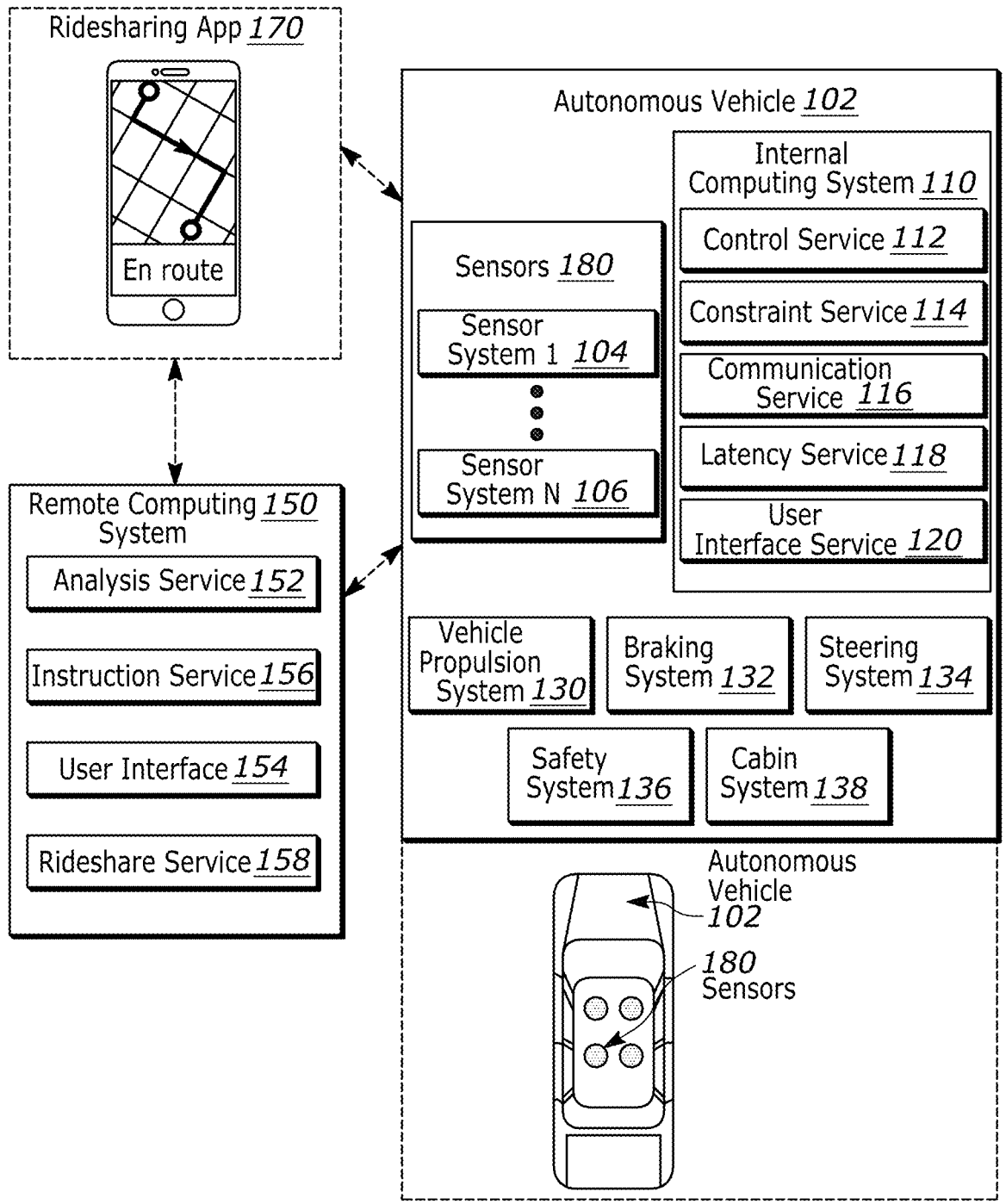
FIG. 1 illustrates an autonomous vehicle and remote computing system architecture in accordance with one embodiment.

A method and system of using a global transformer for efficient early modeling of global context in point clouds are described. The novel global transformer architecture for point cloud backbones is able to efficiently model global context. The global transformer architecture provides competitive accuracy on 3D object classification and 3D part segmentation tasks compared to state-of-the-art baselines. The global transformer architecture is computationally efficient, because the introduction of the global feature tokens reduces the computational complexity from quadratic to linear computations. The global transformer architecture is memory efficient, as it does not require nearest-neighbor sampling compared to other approaches, thus only accessing contiguous memory on a hardware device (e.g., GPU, ASIC, FPGA).

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

As previously mentioned, convnets can not be directly adopted to point cloud data due to the disparity in how the data is organized—structured, regular, and dense 2D grids for images vs. unstructured, irregular, and sparse 3D points for point clouds.

To deal with the disparity in how the data is organized, prior approaches convert point clouds into predefined 3D grids, and apply standard convolution. However, due to the sparsity in point cloud data, such a conversion suffers from high computational cost and information loss. To avoid this, recent approaches instead design network architectures that directly model sparse point cloud data. These approaches typically consist of three types of layers: (1) point-wise feature transform layers, which project feature representations to a different latent space; (2) local feature aggregation layers, which aggregate information within a local spatial neighborhood for each 3D point; and (3) downsampling layers, which condense the information and reduce the resolution of the point cloud. Despite promising improvements, these networks all require stacking multiple local feature aggregation and downsampling layers to gradually increase the receptive field. A receptive field is a region in an input space that affects a particular CNN's feature. A receptive field is a part of a tensor that after convolution results in a feature. Thus, in order to obtain a global (e.g., full scene) receptive field, a considerable amount of layers need to be stacked, which can become a bottleneck for efficiency. Moreover, in practice, stacking multiple aggregation layers results in a much smaller and sparser effective receptive field than a theoretical receptive field.

A transformer architecture of a prior approach achieves larger receptive fields through self-attention, and has shown promising results for various image and point cloud understanding tasks. In addition to having larger receptive fields, the self-attention operator allows each input token to adaptively attend to other tokens. However, this prior approach suffers from quadratic complexity in memory and computation, as each input token attends to all other tokens in the sequence. To address this, existing point cloud transformer methods are forced to either reduce the input resolution or limit the receptive field to a local neighborhood when computing self-attention.

The present disclosure provides a novel point cloud global transformer architecture, which efficiently models global context. Loosely inspired by how humans observe an object or scene from various viewpoints, the point cloud global transformer architecture utilizes a set of global "outlook" tokens (also referred to as global feature tokens) that see the entire scene from some or all of the eight spatial corners of the point cloud. The global feature tokens learn to model the global context, and propagate their information to all local feature points. In one example, only 8 global feature tokens propagate their information to all local feature points (e.g., thousands of local feature points). In this way, unlike full pairwise self-attention, in which every point attends to all other points in the scene (e.g., thousands of points each attending to the thousands of points), only a limited number of global feature tokens (e.g., 1 token per corner) attend to all points, which results in far less computational and memory overhead.

A few prior approaches also use global feature tokens to model global context, but these prior approaches are not designed for point cloud data, and do not directly propagate global information across different resolutions. The global transformer of the present disclosure produces competitive performance compared to state-of-the-art point cloud processing backbones for point cloud recognition and segmentation, while reducing a number of modeling parameters by 85% compared to some prior approaches.

Point cloud backbones can be categorized into three types: voxel-based, local feature aggregation-based, and global feature aggregation-based. Voxel-based methods convert point clouds into 3D voxel grids and apply standard convolution. Local feature aggregation methods aggregate information from local neighbors for each point. A prior approach uses local maximum pooling to encode local information while other approaches generate dynamic kernels for convolution-like operator designed for irregular point cloud inputs. Other approaches study the trade-off in designing deep networks for point clouds; or craft a new local aggregation operator based on vector-attention and the transformer architecture. Despite their effectiveness, these approaches all restrict the receptive field to local neighborhoods, and thus can only model global context near an end of the network architecture.

Transformers were initially designed for machine translation. The transformers use self-attention layers as the basic building block to aggregate information from the entire input sequence for each input element. Transformers have demonstrated promising results on a variety of visual recognition tasks, including image classification, object detection, semantic segmentation, etc. There are a few prior approaches that integrate the attention mechanism into point cloud data. However, these prior approaches for transformer architectures fail to efficiently model global context.

The visual recognition tasks, including image classification, object detection, semantic segmentation, etc. are useful for autonomous vehicles.

FIG. 1 illustrates an autonomous vehicle and remote computing system architecture in accordance with one embodiment. The autonomous vehicle 102 can navigate about roadways without a human driver based upon sensor signals output by sensor systems 180 of the autonomous vehicle 102. The autonomous vehicle 102 includes a plurality of sensor systems 180 (e.g., a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 and communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms (e.g., providing input point cloud data to a global transformer model for efficient early modeling of global context in point clouds), requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102 such as performing object detection for methods (e.g., method of FIG. 3, computer implemented perception algorithm to detect objects within an environment) and systems (e.g., system 400) disclosed herein. The analysis service 152 can also perform analysis pertaining to data associated with one or more errors or constraints reported by autonomous vehicle 102. In another example, the analysis service 152 is located within the internal computing system 110.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

Figure 2A:
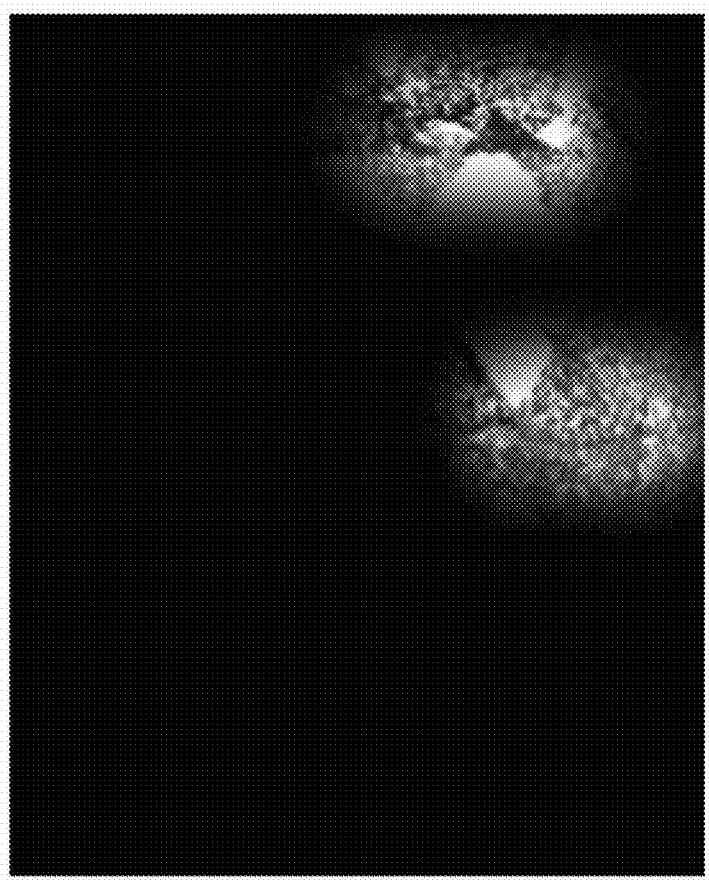
FIG. 2A illustrates a local glimpse of an object to be detected and categorized.
Figure 2B:
FIG. 2B illustrates a global view of the same object in accordance with one embodiment.

For object detection, FIG. 2B illustrates a benefit of having global feature tokens for a global view in comparison to only a local view for FIG. 2A, which illustrates a local glimpse of an object to be detected and categorized. Determining a semantic category of the object based on the points that are visible may be difficult. A local glimpse of the point cloud is generally insufficient for visual recognition as illustrated in FIG. 2A.

FIG. 2B illustrates a global view of the same object in accordance with one embodiment. Upon viewing the global view for a method of object detection, this method easily determines that the object is actually two objects including one leg of a chair and another leg of a table. This is just one example of how a wider global view can aid visual recognition. The present disclosure provides a novel deep network architecture that can efficiently obtain such a wide global view for point cloud data.

The present disclosure provides a deep network architecture that takes as input a point cloud $P \in R^{N0 \times 3}$, and encodes rich multi-scale 3D features $f_i \in R^{N_i \times C_i}$ for point cloud understanding tasks, where $N_i$ and $C_i$ are the number of points and features channels in the i-th stage, respectively. The novel global transformer can be substituted into various types of point cloud backbones. In one example, the global transformer utilizes a small set of global outlook tokens that are initialized as corners of a tightest bounding box of the point cloud. Each global feature token makes use of an attention mechanism to aggregate global context from all local points, and propagates the captured global context back to all local points. The global transformer architecture is designed to be a general and efficient point cloud processing module. Specifically, the global transformer architecture can be plugged into any standard 3D backbone, has competitive accuracy for different downstream tasks, and is lightweight and efficient to be deployed on a variety of devices.

Figure 3:
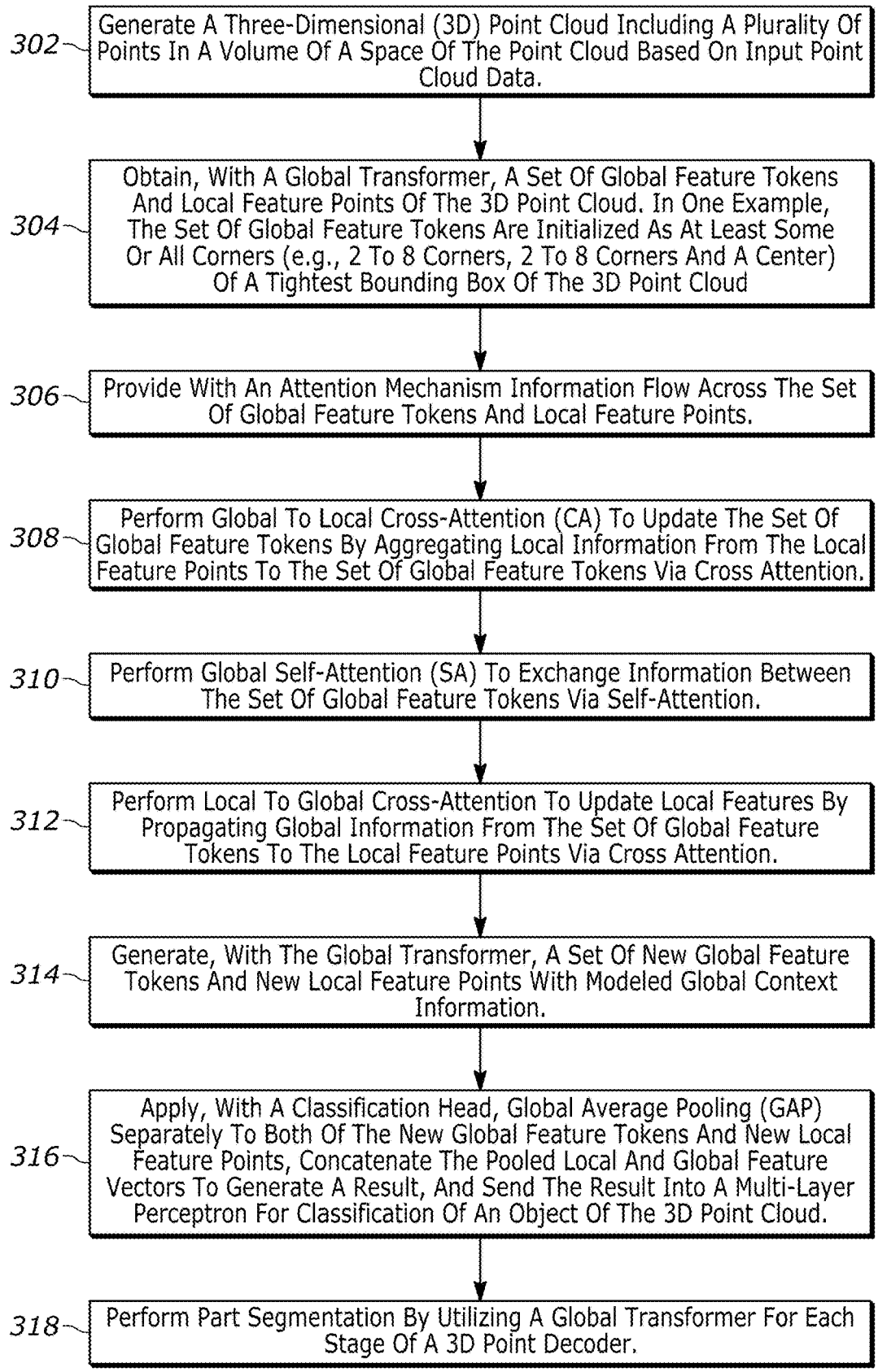
FIG. 3 illustrates a computer-implemented method for utilizing a global transformer architecture as part of a system for object detection and part segmentation in accordance with one embodiment.

FIG. 3 illustrates a computer-implemented method for utilizing a global transformer architecture as part of a system for object detection and part segmentation in accordance with one embodiment. In one example, point cloud data can be obtained from multiple distance measurement sensors that are coupled to a device, which may be a vehicle, such as vehicle 102 of FIG. 1 or a computer system 1200. This computer-implemented method can be performed by processing logic of a data processing system that may comprise hardware (circuitry, dedicated logic, a processor, etc.), software (such as is run on a general purpose computer system or a dedicated machine or a device), or a combination of both. The method can be performed by an internal or remoting computing system of FIG. 1 or the computer system 1200.

At operation 302, the computer-implemented method generates a three-dimensional (3D) point cloud including a plurality of points in a volume of a space of the point cloud based on input point cloud data. The input point cloud data can be obtained from one or more distance measurement sensors. In one example, the sensors may be coupled to a vehicle or a computing system.

At operation 304, the method obtains, with a global transformer, a set of global feature tokens and local feature points of the 3D point cloud. In one example, the set of global feature tokens are initialized as at least some or all corners (e.g., 2 to 8 corners) of a tightest bounding box of the 3D point cloud. In another example, the set of global feature tokens are initialized as at least some or all corners (e.g., 2 to 8 corners) and a center of each edge of a tightest bounding box of the 3D point cloud.

At operation 306, the computer-implemented method provides with an attention mechanism information flow across the set of global feature tokens and local feature points. The information flow can be provided with successive operations 308, 310, and 312.

At operation 308, the computer-implemented method performs global to local cross-attention (CA) to update the set of global feature tokens by aggregating local information from the local feature points to the set of global feature tokens via cross attention.

At operation 310, the computer-implemented method performs global self-attention (SA) to exchange information between the set of global feature tokens via self-attention.

At operation 312, the computer-implemented method performs local to global cross-attention to update local features by propagating global information from the set of global feature tokens to the local feature points via cross attention.

At operation 314, the computer-implemented method generates, with the global transformer, a set of new global feature tokens and new local feature points with modeled global context information.

At operation 316, the computer-implemented method applies, with a classification head, global average pooling (GAP) separately to both of the new global feature tokens and new local feature points to generate pooled local and global feature vectors. Then, the method concatenates the pooled local and global feature vectors to generate a result, and sends the result into a multi-layer perceptron for classification of an object of the 3D point cloud.

At operation 318, the computer-implemented method performs part segmentation by utilizing a global transformer for each stage of a 3D point decoder. Unlike classification, part segmentation requires accurate semantic classification for each point, i.e., it requires the model to encode not only the semantic part (e.g., wheel), but also the object that that part belongs to (e.g. car wheel vs. bicycle wheel).

Figure 4:
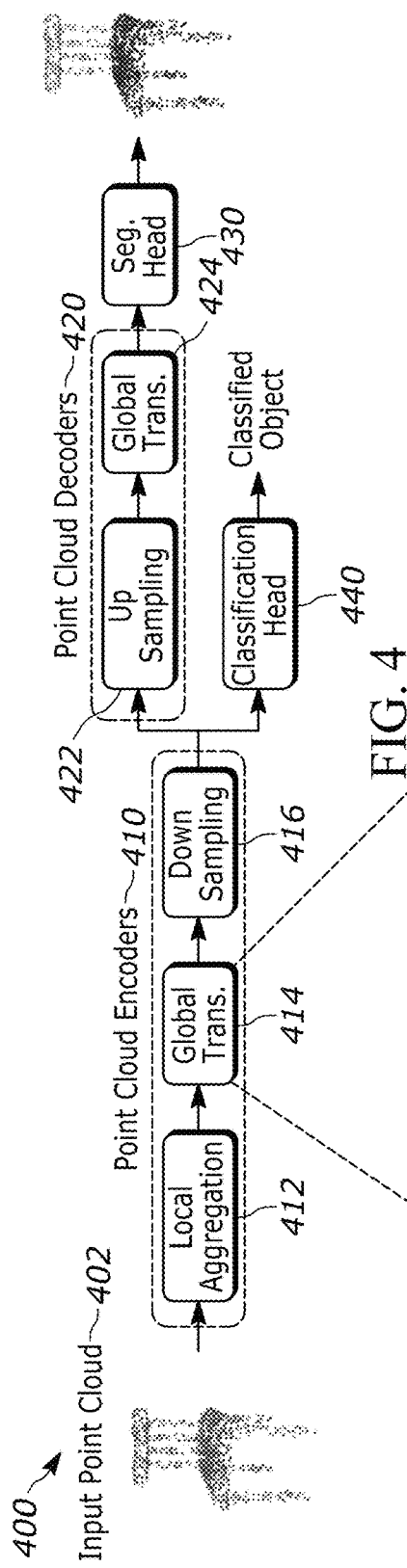
FIG. 4 illustrates a block diagram of a point cloud system having a global transformer architecture in accordance with one embodiment.

FIG. 4 illustrates a block diagram of a point cloud system having a global transformer architecture in accordance with one embodiment. The system 400 includes point cloud encoders 410 (e.g., 5 stages of point cloud encoders), point cloud decoders 420 (e.g., 5 stages of point cloud decoders), a segmentation head 430, and a classification head 440 to classify a detected object (e.g., chair). Each point cloud encoder stage and each decoder stage include the global transformer architecture 500 that is illustrated in more detail in FIG. 5. An initial point cloud encoder stage receives input point cloud data 402 from a point cloud data source (e.g., one or more sensors). Each point cloud decoder 420 include upsampling component 422 and global transformer 424.

In one example, the global transformer 414 is placed at the end of each stage of a 3D point cloud encoder for the following reasons. The last local feature aggregation layer 412 for each stage contains the finest and longest-range semantic encoding of the scene (at that stage), and aggregating local features from this layer allows the model to model the global context in the most efficient way. Also, aggregating the local information with the global transformer 414 right before a downsampling layer 416, compensates to some degree any information loss between successive stages due to downsampling at the end of each stage of a standard 3D point cloud encoder. The global features are propagated through all stages, thus allowing the global feature tokens at the last stage to contain multi-scale information.

Figure 5:
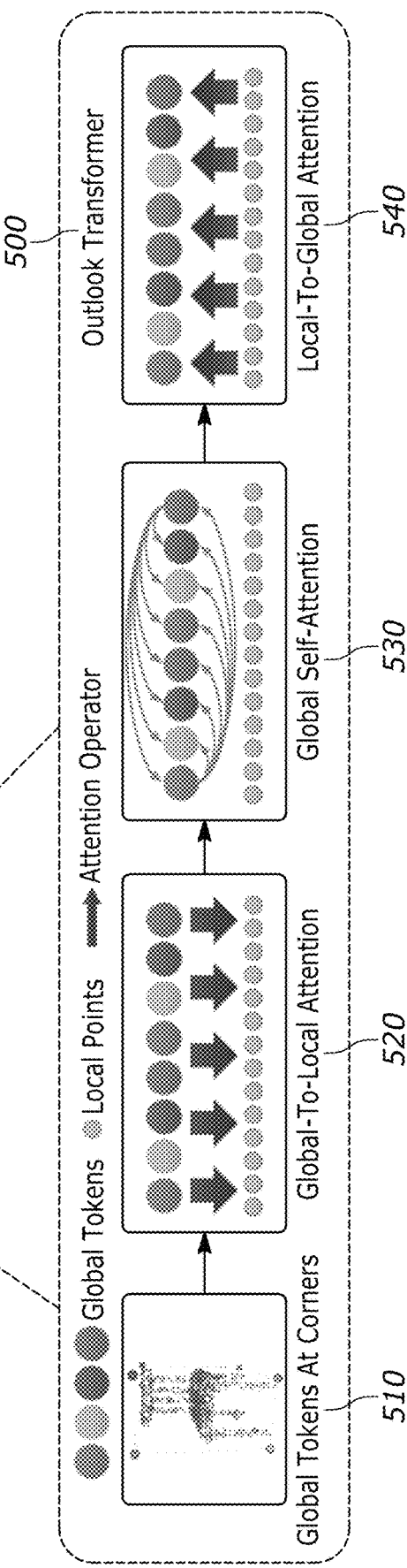
FIG. 5 illustrates a global transformer architecture 500 in accordance with one embodiment.

The global transformer architecture 500 as illustrated in FIG. 5 obtains a set of global feature tokens G with corner initialization 510 and obtains local feature points L. Then, the global transformer enforces information flow across the set of global feature tokens G and local feature points with three successive global to local cross-attention (CA) 520, global self-attention (SA) 530, and local to global cross-attention 540 operations. The global transformer architecture 500 outputs a set of updated or new global feature tokens G' and updated or new local feature points L' with the modeled global context information.

$$\hat{G}=CA(G,L); G'=SA(\hat{G}); L'=CA(L,G') \quad \text{(equation 1)}$$

where $SA(\hat{G})=CA(\hat{G}; \hat{G})$, and $CA(X_q, Xk_v)$ is defined as:

$$q=X_q W_q; k=X_{kv} W_k; v=X_{kv} W_v \quad \text{(equation 2)}$$

$$A=\text{softmax}(qk^T/\text{square root of } d), \hat{X}=Av+X_q \quad \text{(equation 3)}$$

with A being an attention matrix.

For this example, $W_q, W_k, W_v \in R^{C \times d}$ are learnable query, key, and value projection parameters, C and d is the feature dimension and embedding dimension, respectively.

The global-to-local cross-attention 520 updates the global feature tokens by aggregating local information from the local points to global feature tokens via cross attention.

$$\hat{G}=CA(G,L).$$

The Global Self-attention 530 exchanges information between all global feature tokens via self-attention G'=SA (^G). This allows the global feature tokens to communicate with each other, so that their learned context is complementary for the task at hand (e.g., each global feature token modeling a unique aspect of the scene).

The local-to-global cross-attention 540 updates the local features by propagating global information from the global feature tokens to local points via cross attention L'=CA(L, G'). Using the global feature tokens as a proxy, the local points can indirectly attend to any other point that is outside their local neighborhood. Unlike stacking multiple local feature aggregation layers as in prior approaches, this allows each point to attend to even a farthest point in the scene, with just one single extra layer.

For 3D object classification, the classification head 440 generates a classified 3D object.

For part segmentation, the global transformer architecture is added to each stage of a 3D point decoder 420. Unlike classification, part segmentation requires accurate semantic classification for each point, i.e., it requires the model to encode not only the semantic part (e.g., wheel), but also the object that that part belongs to (e.g., car wheel vs. bicycle wheel). Therefore, the global receptive field can also benefit the decoder. A standard 3D point decoder contains several upsampling blocks, each of which fuses the upsampled feature from the previous decoding layer with the corresponding high-resolution feature from the encoder. To further aid the segmentation task with aggregated global context information, the segmentation task additionally concatenates the global-guided local feature (via cross-attention) for the upsampling layer:

$$D_i=T(\text{concat}(up(D_i+1), E_i, CA(up(D_i+1), G_i))) \quad \text{(equation 4)}$$

where $E_i$ and $D_i$ are the encoder and decoder features at stage i, $up(D_i+1)$ upsamples $D_i+1$ to the same resolution as $E_i$, and T is a feature transformation layer (e.g., a 1×1 cony).

Then, we use separate segmentation heads for different object categories. During training, we the per-point cross-entropy loss is applied over the segmentation head for the corresponding shape category.

Figure 6A:
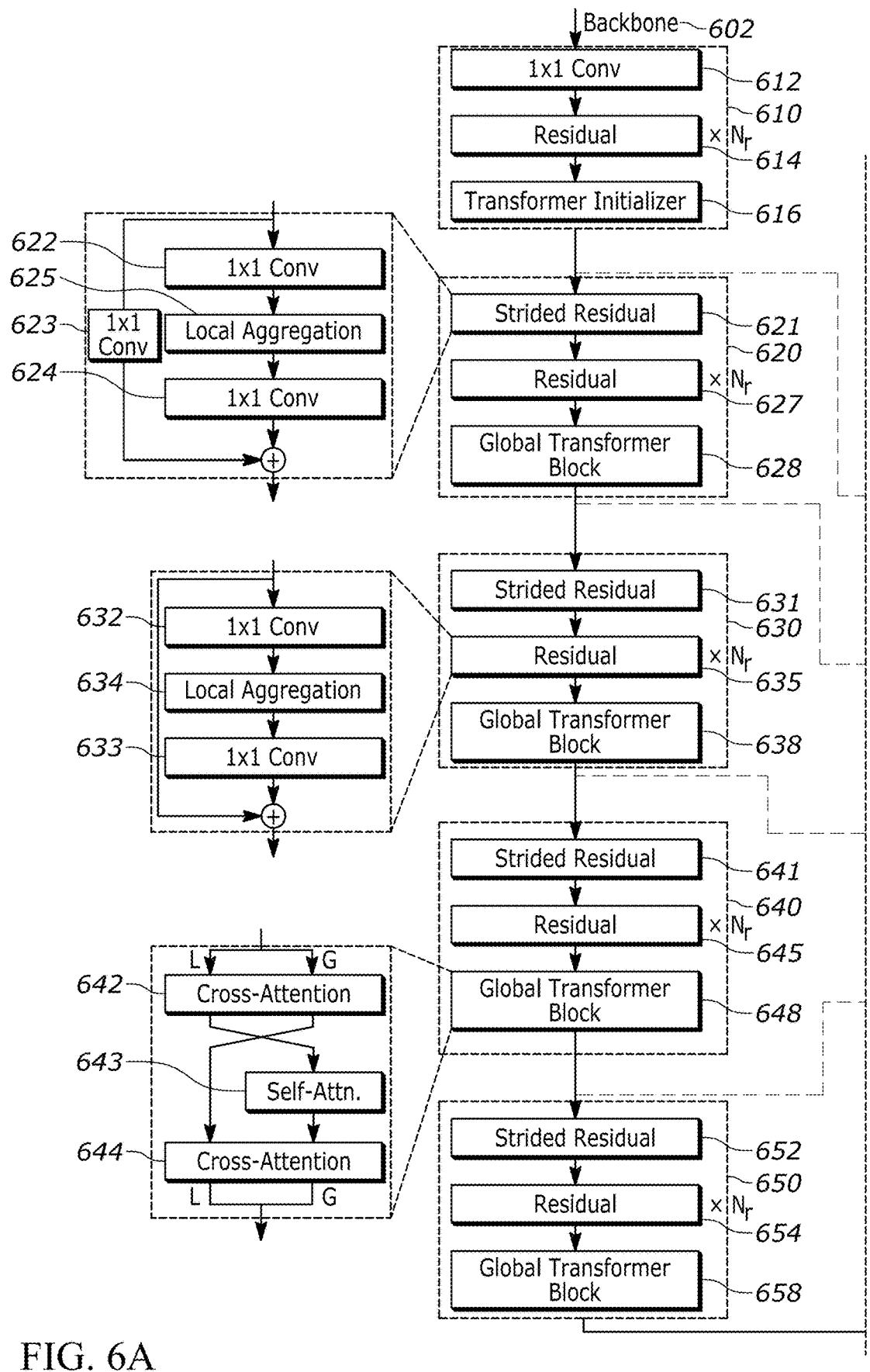
FIGS. 6A and 6B illustrate a detailed block diagram of a point cloud system having a global transformer architecture in accordance with one embodiment.
Figure 6B:
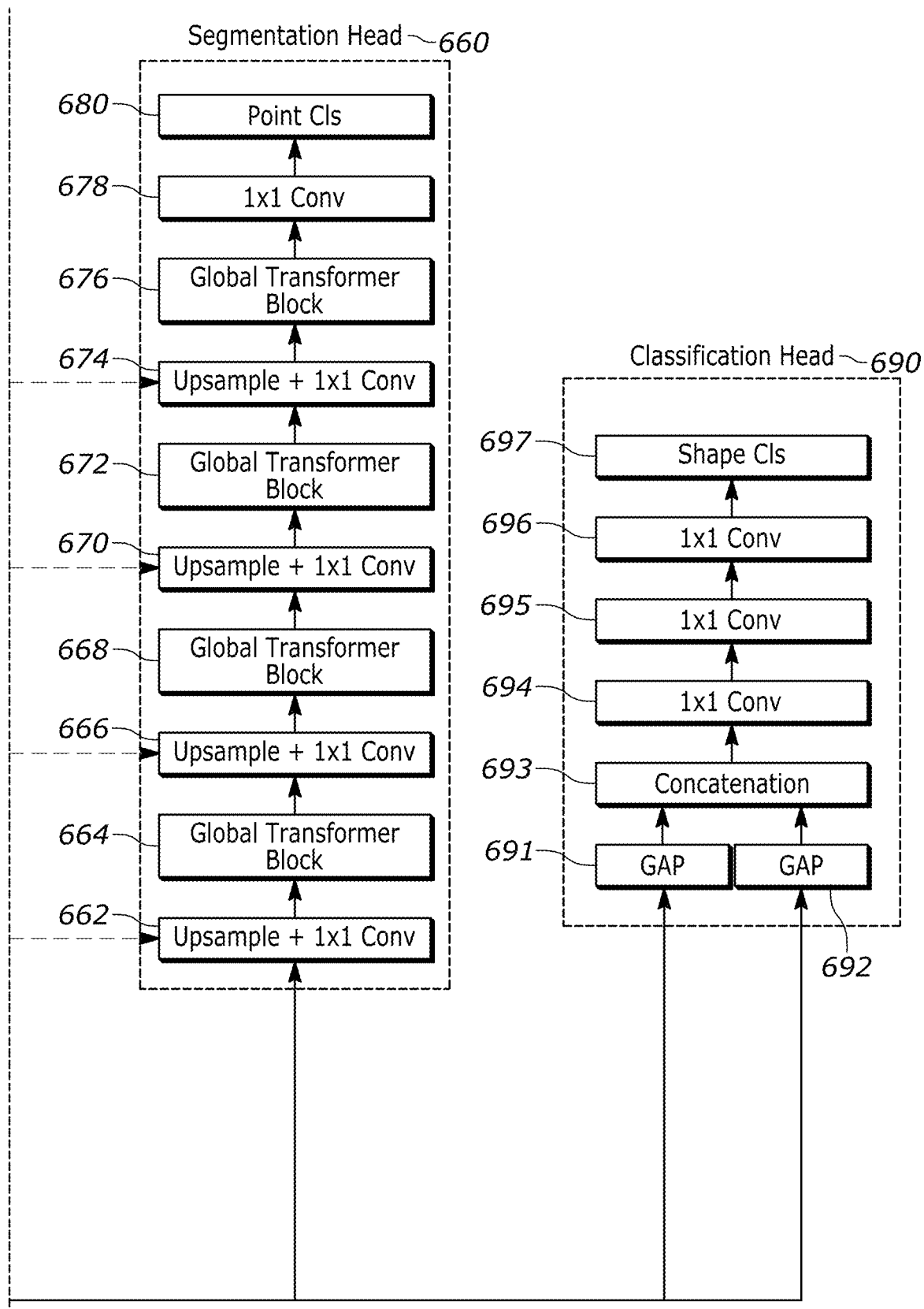

FIGS. 6A and 6B illustrate a detailed block diagram of a point cloud system having a global transformer architecture in accordance with one embodiment. The system 600 includes a backbone 602 with point cloud encoders 610, 620, 630, 640, and 650 (e.g., 5 stages of point cloud encoders), a segmentation head 660, and a classification head 690 to classify a detected object. A backbone is used as a feature extractor to provide a feature map representation of an input. Each pair of upsample component (e.g., 662, 666, 670, 674) and global transformer block (e.g., 664, 668, 672, 676) forms a point cloud decoder stage.

In one example, a 1×1 convolution 612 of an initial point cloud encoder 610 receives input point cloud data (e.g., N×3 with N being points of the point cloud) from a point cloud data source (e.g., one or more sensors) and generates an output. The 1×1 convolution 612 can change dimensionality in a filter dimension. The residual block 614 may have a skip connection and provides an output to a transformer initializer block 616, which initializes (or generates) a set of global feature tokens G at corners and local feature points L. In a specific example, L: $N_p \times C$ and G: $N_G \times d_G$.

Each encoder stage 620, 630, 640, and 650 includes a respective strided residual block 621, 631, 641, 652, a respective residual block 627, 635, 645, 654, and a respective global transformer block 628, 638, 648, and 658.

Each strided residual block includes 1×1 convolutional layers 622, 623, 624, and local aggregation layer 625. In one example, the strided residual block 621 receives the local feature points L: $N_p \times C$. The 1×1 convolutional layer 622 generates $Np \times Co/\gamma$, the local aggregation 625 generates $Np/r \times Co/\gamma$, and the 1×1 convolutional layer 624 generates $Np/r \times Co$ that is summed with output from the 1×1 convolutional layer 623 and then this output from each strided residual is sent to a respective residual block.

A residual block includes 1×1 convolutional layers 632, 633, and local aggregation layer 634. In one example, the residual block 635 receives the local feature points L: $N_p \times C$. The 1×1 convolutional layer 632 generates $Np \times C/\gamma$, the local aggregation 634 generates $Np \times C/\gamma$, and the 1×1 convolutional layer 633 generates $Np \times C$ that is summed with input and then this output from each residual block is sent to a respective global transformer block.

In a similar manner as discussed above for the global transformer architecture 500, each global transformer block (e.g., 628, 638, 648, 658) obtains a set of global feature tokens G at corners and local feature points L, and enforces information flow across the set of global feature tokens G and local feature points with three successive global to local cross-attention (CA) 642, global self-attention (SA) 643, and local to global cross-attention 644 operations. Each global transformer block 628, 638, 648, and 658 outputs a set of new global feature tokens G' and new local feature points L' with the modeled global context information (e.g., block 628 outputs L: $N_p/2 \times 2C$, G: $N_G \times d_G$; block 638 outputs L: $N_p/8 \times 4C$, G: $N_G \times d_G$; block 648 outputs L: $N_p/32 \times 8C$, G: $N_G \times d_G$; block 658 outputs L: $N_p/128 \times 16C$, G: $N_G \times d_G$).

Next, output from an encoder 650 and output from a previous encoder 640 is sent to upsample and 1×1 convolution 662 of segmentation head 660, which then upsamples to generate output L: $N_p/32 \times 4C$, G: $N_G \times d_G$. Output from the global transformer block 664 and output from the encoder 630 is sent to upsample and 1×1 convolution 666, which then upsamples to generate output L: $N_p/8 \times 2C$, G: $N_G \times d_G$.

Output from the global transformer block 668 and output from the encoder 620 is sent to upsample and 1×1 convolution 670, which then upsamples to generate output L: $N_p/2 \times C$, G: $N_G \times d_G$. Output from the global transformer block 672 and output from the encoder 610 is sent to upsample and 1×1 convolution 674, which then upsamples to generate output L: $N_p \times C/2$. The 1×1 convolutional layer 678 generates output $N_p \times C/2$ and then a point cloud block 680 generates an output with form of $N_p \times \#cls$.

For 3D object classification, the classification head 690 generates a classified 3D object by applying global average pooling (e.g., GAP 691, 692) separately to both the local point features L (e.g., L: $N_p/128 \times 16C$) and the global feature tokens G (e.g., G: $N_G \times d_G$) in the last stage to generate pooled local and global feature vectors. Next, the head 690 concatenates the pooled local (e.g., L: $1 \times 16C$) and global feature vectors (e.g., G: $1 \times d_G$) with concatenation block 693, and sends the result (e.g., $1 \times (16C+d_G)$) into a multi-layer perceptron (e.g., 1×1 conv 694 to generate 1×8C, 1×1 conv 695 to generate 1×4C, 1×1 conv 696 to generate 1×2C, shape classification 697 to generate 1×#cls) for final classification with:

$$\text{logits} = \text{softmax}(\text{MLP}(\text{concat}(f_L; f_G))) \quad \text{(equation 5)}$$

where $f_L$, and $f_G$ are the pooled local and global feature vectors, respectively.

Since the global feature tokens from the last stage encompass information from the earliest stage (highest resolution) all the way to the last stage (smallest resolution), we do not need to explicitly apply multi-scale feature fusion strategies. During training, this system 600 uses label smoothing and the cross-entropy loss for 3D object classification.

Ideally, each of the global feature tokens should model a different aspect of the point cloud object or scene, so that the global feature tokens are complementary to each other when modeling global context. If the global outlook tokens are initialized in a way in which the global feature tokens are highly correlated, then the global feature tokens can be susceptible to collapsing into the same vector. To overcome this, corner initialization is performed, which is both efficient and effective. Then, the global feature token coordinates Gxyz are initialized to be the eight corners of the tightest bounding box of the point cloud, and their features are initialized to zeros.

An alternative option would be to use farthest point sampling, which is common practice for sampling an evenly distributed subset of a given point cloud. However, farthest point sampling requires an iterative process of comparing the pairwise distances between the points selected and all other points, which can add a non-trivial amount of computation.

Training a conventional 3D backbone with a transformer plugin architecture can be non-trivial. Unlike previous approaches that either utilize transformers as feature encoders or task-specific decoders, the global transformer serves as an additional feature pathway that aids the model for downstream tasks, while preserving the representation power of the 3D backbone (base network), and this can cause optimization issues if not treated properly.

In the following, the challenge in training is discussed, and two simple techniques are disclosed to improve training stability. In order to avoid complex hyperparameter tuning, this process starts with the hyperparameters tuned for the base network, and then searches for a minimal set of hyperparameters to tune the global transformer architecture.

To demonstrate the challenge of training the global transformer as a plug-and-play architecture, the model is trained with three different learning rates: (1) a large learning rate following the default setting of the base network; (2) a small learning rate tuned specifically for the transformer module; and (3) and a medium learning rate that is in between. The parameter update ratio (abs value (delta p)/abs value (p)) is monitored during training.

FIGS. 7A, 7B, 7C, and 7D show training analysis with large 710, medium 720, small 730, and decoupled learning rate (LR) 740. Training with a decoupled LR 740 leads to a stable training and a higher IoU metric with the IoU metric being equal to area of overlap between predicted segmentation and the ground truth divided by area of union for predicted segmentation and the ground truth. If the prediction is completely correct, IoU=1. The lower the IoU, the worse the prediction result. The criteria msIoU of FIG. 7D is used for identifying whole object regions.

As shown in FIG. 7B, the transformer trains well with a smaller learning rate 730. With a large LR, after 100 iterations, the model parameters barely get updated (e.g., update ratio is less than 1e−5). With the medium LR 720, large spikes in gradients are observed, which cause instability in training. Using the small LR 730 is also not optimal, as it prevents the base network from being effectively updated as illustrated in FIG. 7A.

The modeling process then monitors the norm of the two variables in the same residual pathway in a cross attention (CA) module. As shown in FIG. 7C, after training for 100 iterations with the large learning rate, the difference between the norm of these two pathways skyrockets to a ratio of around 200:1. As this occurs at the same time as when the gradient vanishes in the transformer module (see FIG. 7B), the modeling process further investigates this problem.

Consider a network that contains two sub networks, F and G, with input data x: $\Phi(F; G; x)$, and it is trained to minimize the objective function L. Suppose there is an imbalance during training between F and G so that F is already on a good path to minimizing L, while G is not. In order to further minimize L, there are two solutions: (a) update the weights of G; (b) ignore the outputs of G, and make predictions solely based on F. If L cannot be minimized easily by updating G, it is likely that solution (b) will be gradually applied.

In the case of FIG. 7C, the base network is modeled as F where its hyperparameters have already been tuned, and the transformer module modeled as G where its hyperparameters have not been tuned. The imbalance described in the previous paragraph can easily happen when the optimization for G falls behind. As a result, the network can take a shortcut to increase the outputs of F to be orders of magnitude larger than G's, and G's outputs are thus ignored. To make matters worse, after such a phenomenon occurs, very few gradients will then be back-propagated to G, and this gradient vanishing can make it become a dead sub network that is never effective again.

To avoid complex hyperparameter tuning, two simple techniques are determined to be fairly effective for stabilizing the training of the global transformer as a plug and-play module.

For decoupled learning rate tuning, both pathways are optimized at a similar "pace"—similar to the balance between discriminator and generator in adversarial networks. Since the hyperparameters for the base network are already tuned, decoupled learning rate tuning uses all hyperparameters from the base network, and only varies the learning rate for the transformer blocks.

As shown in FIG. 7D, this simple technique effectively stabilizes the training of the whole network, and the network results in a high mIoU in evaluation.

However, even with the decoupled learning rate tuning, it is still possible that the imbalance between pathways occur. Since all other parameters are tuned for the base network, it is likely that the transformer pathway becomes the "weaker" one. When this happens, an additional objective function that optimizes directly over the transformer tokens can help increase their semantic richness and retain the pathway balance. Thus, the modeling process applies an auxiliary classification loss on the average-pooled global feature tokens. Since it is desirable for the backbone to have the generalizability for both classification and segmentation tasks, the modeling process attaches several projection layers before the classification head to preserve fine-grained details in the feature. This operation is cost-free during evaluation since all of the extra layers introduced are only used during training.

In one example, the modeling process sets the loss weight to 0:01.

Experimental Results

The novel global transformer is evaluated on both point cloud classification and segmentation tasks. This involves analyzing the diversity of the learned global feature tokens, the effectiveness of loss functions and different design choices (e.g., initialization and number of global feature tokens) via ablation studies.

The evaluation process sets all of our hyperparameters following their small configurations (e.g., base channel width Nr=36). The dimensionality of the global vectors and hidden states of the global Transformer Block is set to 128, and then use standard neural network (nn). MultiheadAttention from PyTorch with nhead=4 to implement attention operators. Then, Fourier positional encodings are used for the XYZ coordinates in the global transformer block. This evaluation process follows a training schedule to train the global transformer models on a hardware device (e.g., (16 GB)) GPUs.

3D Part Segmentation

For a dataset, ShapeNetPart consists of 16,880 models from 16 shape categories, with 14,006 models for training and 2,874 for testing. It contains 50 different parts in total, and the number of parts for each category is between 2 and 6. The test results are reported per-category mean IoU (mIoU) and mean IoU averaged over all test instances (mIoU).

PartNet is a more recent challenging benchmark for large-scale fine-grained part segmentation. It consists of 26,671 3D object models in 24 object categories, and the average number of parts for each object is 18. The dataset is split into three parts: 70% training, 10% validation, and 20% testing. This evaluation process trains the global transformer model with the training split and presents our results on both validation set and test set. Per-category mean IoU (mcIoU) is reported. Then, this evaluation process will preprocess both part segmentation datasets with grid sampling with a base grid size of 2 cm and an input resolution of 10,000 points. Tables 1 and 2 show the results.

TABLE 1

| Method | ShapeNetPart | | PartNet | |
| | mcIoU | mIoU | val | test |
| --- | --- | --- | --- | --- |
| PointNet | 80.4 | 83.7 | — | 35.6 |
| PointNet++ | 81.9 | 85.1 | — | 42.5 |
| PointCNN | 84.6 | 86.1 | — | 46.4 |
| DGCNN | 85.0 | 84.7 | — | 44.6 |

TABLE 1-continued

| Method | ShapeNetPart | | PartNet | |
| | mcIoU | mIoU | val | test |
| --- | --- | --- | --- | --- |
| DensePoint | 84.2 | 86.4 | — | — |
| KPConv | 85.1 | 86.4 | — | — |
| PAConv | 84.6 | 86.1 | — | — |
| PointTransformer | 83.7 | 86.6 | — | — |
| CloserLook3D (L) | 84.6 | 85.9 | 50.8 | 53.8 |
| CloserLook3D (S) | 83.3 | 85.2 | 46.1 | 47.2 |
| Global Transformer | 83.9 | 85.8 | 49.1 | 52.3 |

TABLE 2

| Local Aggr. Op. | Config | mIoU | |
| | | val | test |
| --- | --- | --- | --- |
| Point-wise MLP | baseline | 45.3 | 47.0 |
| | G. Trans | 49.1 (+4.2) | 52.3 (+5.3) |
| Adaptive Weights | baseline | 44.1 | 46.1 |
| | G. Trans | 48.3 (+4.2) | 50.7 (+4.6) |
| Pseudo Grid | baseline | 44.2 | 45.2 |
| | G. Trans | 48.6 (+4.4) | 51.2 (+6.0) |
| PosPool (xyz) | baseline | 44.6 | 47.2 |
| | G. Trans | 48.4 (+3.8) | 51.0 (+3.8) |
| PosPool (sin/cos) | baseline | 46.1 | 47.2 |
| | G. Trans | 48.9 (+2.8) | 51.2 (+4.0) |

For CloserLook3D and the global transformer model (G. Trans in Table 2) of the present disclosure, the local aggregation configuration that has the best value/test performance is reported. On the challenging PartNet dataset, the global transformer model achieve a highly competitive mIoU of 52.3 on the test set, which is a significant 5.1 point improvement over the CloserLook3D (S) base network. Adding just ~2 million (M) parameters to CloserLook3D (S), the global transformer method with a total of 3.5 M parameters is only a bit lower in mIoU than CloserLook3D (L) which has 18.5 M parameters, and significantly better than other prior methods. Notably, when using the Pointwise-MLP operator, the global transformer method with a total of 3.5 M parameters outperforms CloserLook3D (L), which has 25.6 M parameters, by 0.8 mIoU (52.3 vs 51.5) on the test set. These results validate the parameter efficiency of the global transformer of the present disclosure. On ShapeNetPart, the global transformer model also provides a small improvement over the base network, and achieves competitive performance relative to the state-of-the-art.

In Table 2, the global transformer is compatible with all the local aggregation operators proposed in CloserLook3D. The global transformer consistently makes improvements over the baselines. Notably, on pseudo grid, The global transformer model makes a significant improvement in mIoU of 6.0. The global attention implicitly converts its rigid kernels to deformable ones, and enables it to have larger capacity and representation power.

Figure 8:
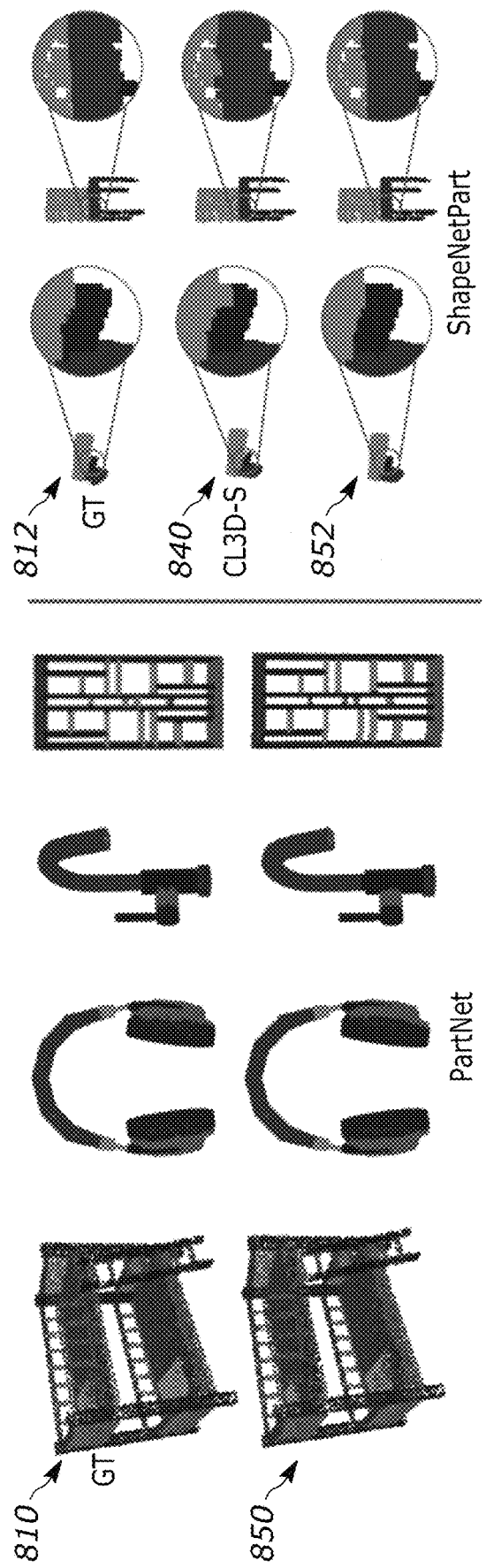
FIG. 8 illustrates generating accurate part segmentations by a global transformer, despite some error in details in accordance with one embodiment.

As shown in FIG. 8, the global transformer 850 and 852 is often able to generate accurate part segmentations, despite some error in details. In particular, the segmentations for the global transformer 852 are more accurate and sharper along the object edges than the baseline CloserLook3D 840. This is likely because the global feature tokens provide larger context cues that enable more fine-grained classification of points. GT 810 and 812 represent a ground truth (GT).

3D Object Classification

ModelNet40 consists of 12,311 CAD models from 40 classes. Data is preprocessed with grid sampling with a base grid size of 2 cm and an input resolution of 5,000 points. Then the overall accuracy (OA) metric is evaluated over all test samples.

Table 3 shows results. First, when incorporating the global transformer to CloserLook3D (small config), the global transformer model provides a 0.5 improvement in an overal accuracy (OA) metric, which indicates the usefulness of global context for point classification. Notably, this model slightly outperforms the Closer-Look3D (large config) at a fraction of the parameter count. The novel global transformer also produces competitive results compared to related state-of-the-art approaches.

TABLE 3

| Method | OA | param |
|---|---|---|
| PointNet | 89.2 | — |
| PointNet++ | 90.7 | — |
| PointCNN | 92.2 | 0.6M |
| DGCNN | 92.2 | — |
| PointWeb | 92.3 | — |
| DensePoint | 93.2 | 0.7M |
| KPConv | 92.7 | 15.2M |
| PAConv | 93.9 | — |
| PointTransformer | 93.7 | — |
| CloserLook3D (L) | 92.9 | 19.4M |
| CloserLook3D (S) | 92.5 | 1.2M |
| Global Transformer† | 92.8 | 2.3M |
| Global Transformer | 93.0 | 3.1M |

Incorporating the global transformer to the CloserLook3D (small config) backbone enables it to outperform the CloserLook3D large config with only 0.8 M extra parameters. †: only using global feature tokens for classification. PosPool (xyz) is used as the local aggregation operator.

Verifying the effectiveness of the global feature tokens occurs by only using the global feature tokens (without the local features) for classification, which requires the global feature tokens to encode semantic rich features. As shown in Table 3, despite being 0.2 points lower than our full model, it still shows a small improvement over the baseline model. We also qualitatively verify the effectiveness of the global feature tokens in two ways.

Figure 9:
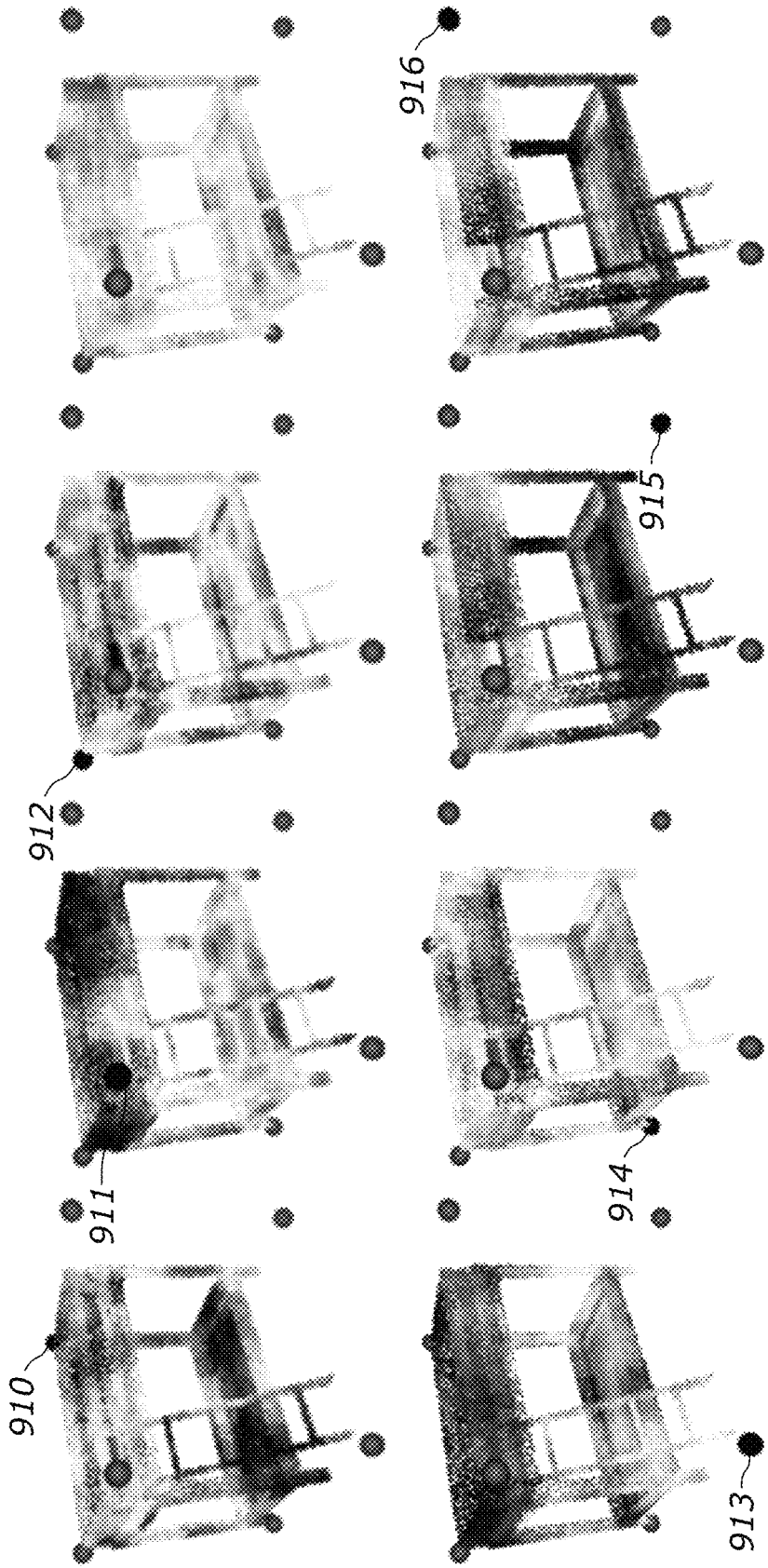
FIG. 9 illustrates each global feature token modeling a unique aspect of a scene, and results in a diverse attention map in accordance with one embodiment.

Ideally, the global feature tokens should be diverse enough so that the global feature tokens attend to different parts of the scene, and encode different aspects of object features. To verify this, the evaluation process computes and visualizes the attention map of the Local-to-Global attention in FIG. 9. Thanks to the diverse global feature tokens 910-916, different local points tend to attend to different global feature tokens. This suggests that the global feature tokens are able to model different aspects of the global scene and object information. FIG. 9 illustrates how different unique global feature tokens each positioned in a different location (e.g., different corner) attend to different parts of a scene that includes a bed frame. An upper right image in FIG. 9 does have a global feature token located in a bottom right rearward corner, however this global feature token is occluded by the bed frame and not visible in FIG. 9.

Figure 10:
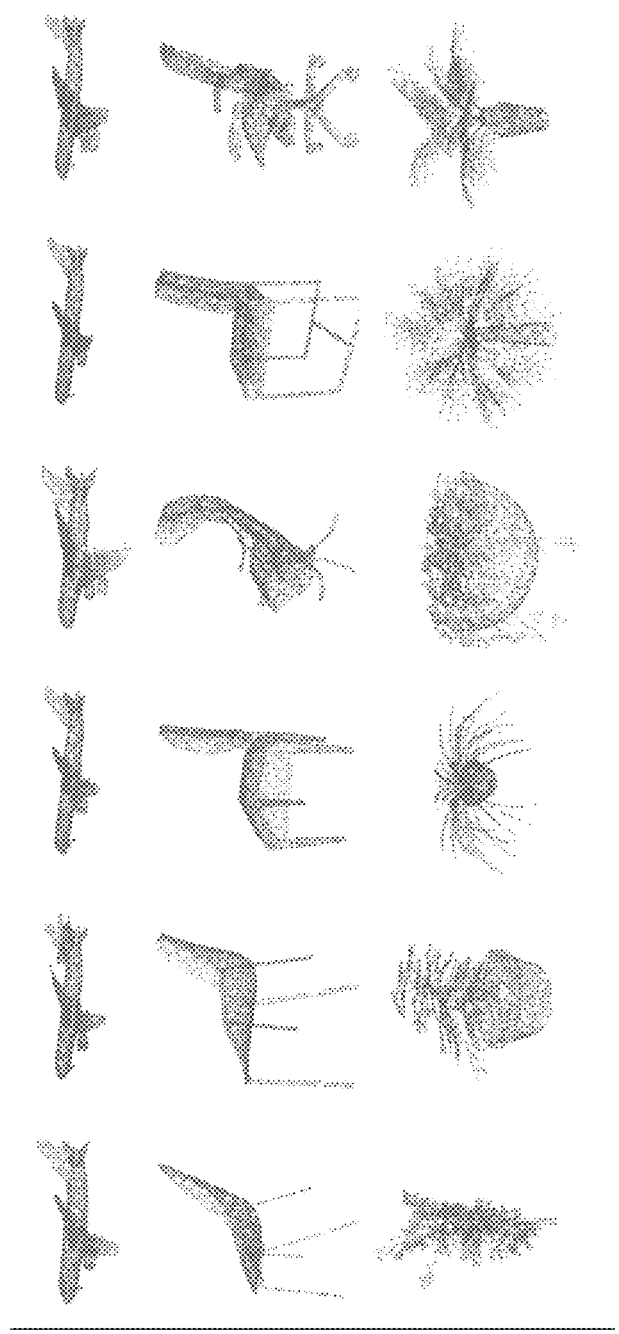
FIG. 10 illustrates using an average pooled global vector as the query (the leftmost column), to retrieve the CAD models on the right, sorted by their distance to the query in ascending order in accordance with one embodiment.

The global feature tokens encode meaningful semantic information, in such a way that the global feature tokens provide accurate predictions. To demonstrate this, the average-pooled global feature tokens are used for shape retrieval on ModelNet40. The average pooled global vectors are used as the query (column 1020) of FIG. 10, to retrieve the CAD models on the right, sorted by their distance to the query in ascending order. As shown in FIG. 10, by using the global feature tokens as features for retrieval, objects are successfully retrieved with similar semantic information as the query. Row 1001 includes airplanes, row 1002 includes chairs, and row 1003 includes trees or plants. Moreover, row 1002 (chairs) shows that the more similar the shapes are to each other, the closer the distance between their global feature tokens. These visualizations further demonstrate that our global feature tokens contain meaningful semantic information.

Finally, ablation studies are performed to analyze the different design choices of the global transformer model. How the number of global feature tokens affects the network's ability to model global context is determined.

TABLE 4

| Ablation studies on PartNet | | | | | |
|---|---|---|---|---|---|
| | | | | mIoU | |
| | $N_G$ | init G | $L_{aux}$ | val | test |
| CloserLook3D (S) | — | — | | 44.6 | 47.2 |
| Type of init. | 8 | FPS | | 46.6 | 48.4 |
| | 8 | corner | | 47.7 | 50.2 |
| # of tokens | 1 | center | | 46.9 | 49.7 |
| | 8 | corner | | 47.7 | 50.2 |
| | 20 | C + E | | 48.0 | 49.8 |
| Auxiliary Cls. | 8 | corner | | 47.7 | 50.2 |
| | 8 | corner | ✓ | 48.4 | 51.0 |

As shown in Table 4, utilizing only a single global feature token at the center of the scene has a 2.0 mIoU increase compared to the baseline, which still demonstrates the effectiveness of having global feature tokens. However, it is 0.8% mIoU lower on the validation set compared to an eight corner initialization. This suggests that more global feature tokens can model more aspects of the scene, and it in part reflects the diverseness of the global feature tokens. Furthermore, when sampling 12 more points in the center of each edge of the scene bounding box (C+E initialization), and the results show similar performance compared to having eight corner tokens. Thus, eight corner tokens are sufficient for modeling global context.

Next corner initialization is compared with the standard furthest point sampling (FPS). As shown in Table 4, corner initialization causes the mIoU to drop by 1.1. It is believed that the random initialization of FPS adds additional noise to the gradients, and thus makes the network harder to optimize. Furthermore, the iterative updates that FPS needs makes it harder to parallelize on the GPU, potentially requiring more computation. Thus, corner initialization is selected for the global transformer.

In Table 4, experiments are performed to study the effectiveness of the auxiliary classification loss. The auxiliary classification loss leads to 0.7 and 0.8 mIoU improvements on value and test set respectively. This shows that having an additional objective function that directly optimizes over the global feature tokens can ensure feature richness and aid training.

Transformers have made impressive progress in natural language processing and image recognition tasks. Due to the sparsity and irregular nature of the point cloud data, it is a natural fit to adopt the transformer architecture for 3D point cloud understanding. However, the quadratic complexity of many transformers hinders direct application to many real-time applications, like autonomous driving and robot navigation. The global transformer of the present disclosure equips the transformer to efficiently retain a global receptive field with only linear computation and memory complexity, and demonstrates promising results on different datasets and tasks. The global transformer is thus ideally suited for real-time applications, like autonomous driving and robot navigation.

As demonstrated in the ablation, having more global feature tokens is crucial for a strong representation power. Therefore, in larger and more complex scenes (e.g., outdoor scenes for 3D object detection), eight corners might not be sufficient for faithfully modelling the global context. Thus, the model may need more global feature tokens and possibly a better sampling strategy may need to be adopted as well.

Point cloud data has become a common input modality for many vision applications, including autonomous driving, robot navigation, etc. Applications of these technologies have various foreseeable benefits: (1) advanced autonomous driving technologies can help reduce traffic accidents; (2) advanced navigation systems can be useful for building accessibility infrastructures; etc. In all these applications, there is a strong demand for an accurate and efficient backbone for point cloud processing.

Figure 11:
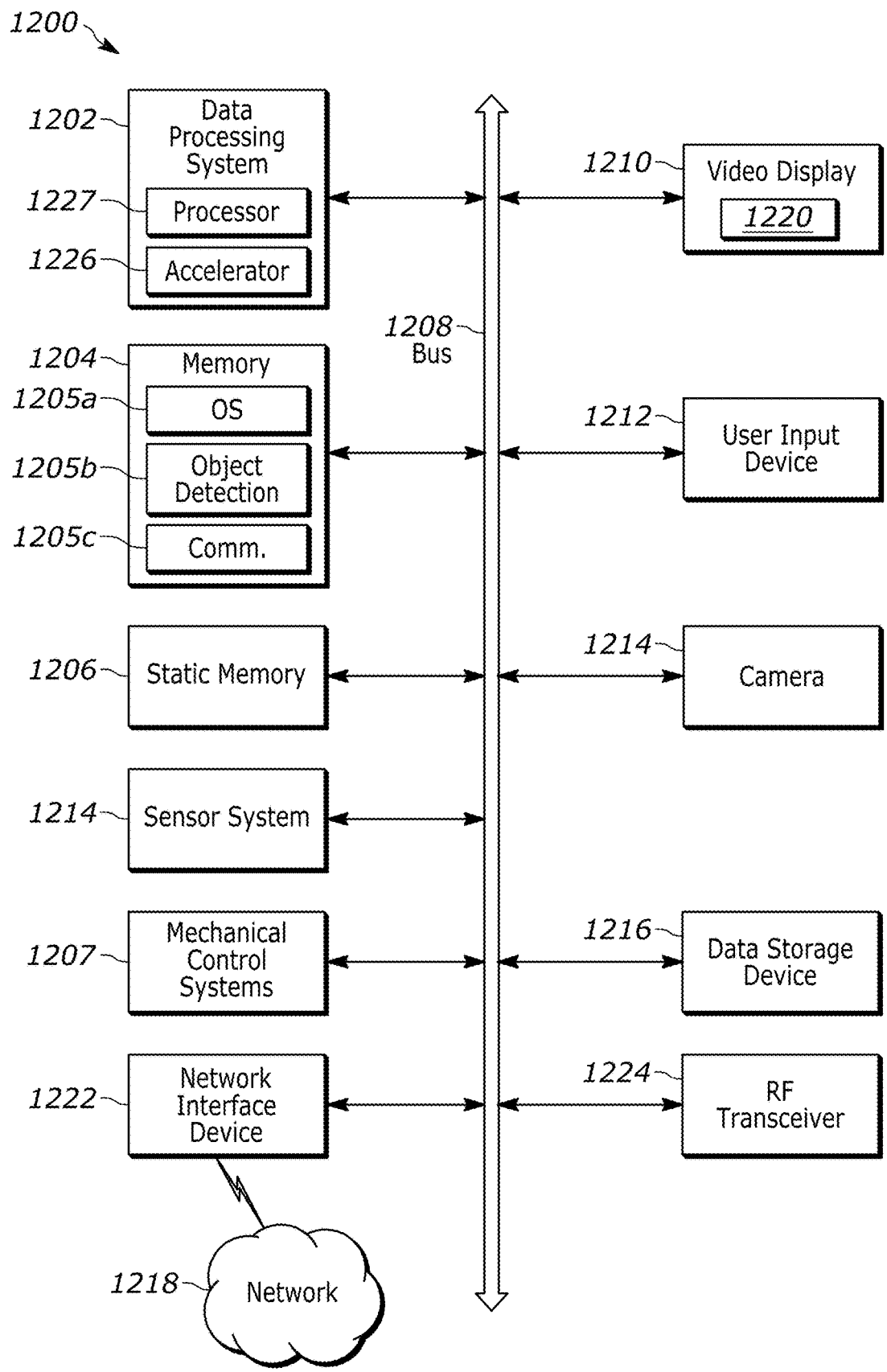
FIG. 11 illustrates a diagram of a computer system including a data processing system according to an embodiment of the invention.

FIG. 11 is a diagram of a computer system including a data processing system that utilizes processing logic according to an embodiment of the invention. Within the computer system 1200 is a set of instructions for causing the machine to perform any one or more of the methodologies discussed herein including machine learning operations for object detection and part segmentation. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202, as disclosed above, includes processing logic in the form of a general purpose instruction-based processor 1227 or an accelerator 1226 (e.g., graphics processing units (GPUs), FPGA, ASIC, etc.)). The general purpose instruction-based processor may be one or more general purpose instruction-based processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Data processing system 1202 is configured to implement the data processing system for performing the operations and steps discussed herein. The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement the data storing mechanisms for performing the operations and steps discussed herein. Memory 1206 can store code and/or data for use by processor 1227 or accelerator 1226. Memory 1206 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 1227 and accelerator 1226 execute various software components stored in memory 1204 to perform various functions for system 1200. Furthermore, memory 1206 may store additional modules and data structures not described above.

Operating system 1205a includes various procedures, sets of instructions, software components and/or drivers for controlling and managing general system tasks and facilitates communication between various hardware and software components. Object detection and segmentation algorithms 1205b (e.g., method 300, computer implemented method for perception, etc.) utilize sensor data from the sensor system 1214 to detect objects and perform segmentation for different applications such as autonomous vehicles or robotics. A communication module 1205c provides communication with other devices utilizing the network interface device 1222 or RF transceiver 1224.

The computer system 1200 may further include a network interface device 1222. In an alternative embodiment, the data processing system disclose is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), and a Graphic User Interface (GUI) 1220 (e.g., a touch-screen with input & output functionality) that is provided by the display 1210.

The computer system 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202 by the computer system 1200, the main memory 1204 and the data processing system 1202 also constituting machine-readable storage media.

In one example, the computer system 1200 is an autonomous vehicle that may be connected (e.g., networked) to other machines or other autonomous vehicles in a LAN, WAN, or any network 1218. The autonomous vehicle can be a distributed system that includes many computers networked within the vehicle. The autonomous vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The autonomous vehicle can operate in the capacity of a server or a client in a client-server network environment, or as a peer machine in a peer-to-peer (or distributed) network environment. The storage units disclosed in computer system 1200 may be configured to implement data storing mechanisms for performing the operations of autonomous vehicles.

In one example, as the autonomous vehicle travels within an environment, the autonomous vehicle can employ one or more computer-implemented object detection algorithms as described herein to detect objects within the environment. At a given time, the object detection algorithm can be utilized by the autonomous vehicle to detect a type of an object at a particular location in the environment. For instance, an object detection algorithm can be utilized by the autonomous vehicle to detect that a first object is at a first location in the environment (where the first vehicle is located) and can identify the first object as a car. The object detection algorithm can further be utilized by the autonomous vehicle to detect that a second object is at a second location in the environment (where the second vehicle is located) and can identify the second object as a car. Moreover, the object detection algorithm can be utilized by the autonomous vehicle to detect that a third object is at a third location in the environment 100 (where a pedestrian is located) and can identify the third object as a pedestrian. The algorithm can be utilized by the autonomous vehicle to detect that a fourth object is at a fourth location in the environment (where vegetation is located) and can identify the fourth object as vegetation.

The computer system 1200 also includes sensor system 1214 and mechanical control systems 1207 (e.g., motors, driving wheel control, brake control, throttle control, etc.). The processing system 1202 executes software instructions to perform different features and functionality (e.g., driving decisions) and provide a graphical user interface 1220 for an occupant of the vehicle. The processing system 1202 performs the different features and functionality for autonomous operation of the vehicle based at least partially on receiving input from the sensor system 1214 that includes lidar sensors, cameras, radar, GPS, and additional sensors. The processing system 1202 may be an electronic control unit for the vehicle.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A computer implemented method of object detection and part segmentation, the computer implemented method comprising:
    generating a three-dimensional (3D) point cloud including a plurality of points in a volume of a space of the point cloud in response to receiving point cloud data;
    initially obtaining, with a global transformer, a set of global feature tokens to model global context of the 3D point cloud and local feature points of the 3D point cloud;
    enforcing with the global transformer an attention mechanism information flow across the set of global feature tokens and local feature points including a global to local cross-attention (CA) to update the set of global feature tokens by aggregating local information from the local feature points to the set of global feature tokens via cross attention; and
    generating, with the global transformer that is utilized for object detection and part segmentation, a set of new global feature tokens and new local feature points with modeled global context information based on the attention mechanism information flow.

2. The computer implemented method of claim 1, wherein the set of global feature tokens are initialized as corners of a tightest bounding box of the 3D point cloud.

3. The computer implemented method of claim 1, wherein enforcing with an attention mechanism information flow across the set of global feature tokens and local feature points comprises:
    the global to local cross-attention (CA) to update the set of global feature tokens by aggregating local information from the local feature points to the set of global feature tokens via cross attention;
    a global self-attention (SA) to exchange information between the set of global feature tokens via self-attention; and
    a local to global cross-attention to update local features by propagating global information from the set of global feature tokens to the local feature points via cross attention.

4. The computer implemented method of claim 1, further comprising:
    applying global average pooling (GAP) separately to both of the new global feature tokens and new local feature points in a classification head to generate pooled local and global feature vectors; and
    concatenating pooled local and global feature vectors to generate a result.

5. The computer implemented method of claim 4, further comprising:
    sending the result into a multi-layer perceptron for classification of an object of the 3D point cloud.

6. The computer implemented method of claim 1, further comprising:
    utilizing a global transformer for each stage of a 3D point decoder for part segmentation.

7. The method of claim 1, wherein the set of global feature tokens attend to all local feature points.

8. The computer implemented method of claim 7, wherein the set of global feature tokens reduces a computational complexity for object detection from quadratic to linear with respect to input size of the point cloud data.

9. The computer implemented method of claim 1, wherein the point cloud data is received from one or more distance measurement sensors that are coupled to a vehicle.

10. A system for object detection and part segmentation, the system comprising:
a memory storing instructions; and
a processor coupled to the memory, the processor is configured to execute instructions to:
receive point cloud data;
generate a three-dimensional (3D) point cloud including a plurality of points in a volume of a space of the point cloud based on the point cloud data;
obtain a set of global feature tokens to model global context of the 3D point cloud and local feature points of the 3D point cloud;
perform a global to local cross-attention (CA) to update the set of global feature tokens by aggregating local information from the local feature points to the set of global feature tokens via cross attention; and
generate a set of new global feature tokens and new local feature points with modeled global context information for object detection and part segmentation, wherein the set of global feature tokens are initialized as at least two corners of a tightest bounding box of the 3D point cloud.

11. The system of claim 10, wherein the set of global feature tokens are initialized as at least four corners of a tightest bounding box of the 3D point cloud.

12. The system of claim 10, wherein the processor is configured to execute instructions to:
perform a global self-attention (SA) to exchange information between the set of global feature tokens via self-attention; and
perform a local to global cross-attention to update local features by propagating global information from the set of global feature tokens to the local feature points via cross attention.

13. The system of claim 10, wherein the processor is configured to execute instructions to:
apply global average pooling (GAP) separately to both of the new global feature tokens and new local feature points to generate pooled local and global feature vectors;
concatenate the pooled local and global feature vectors to generate a result;
send the result into a multi-layer perceptron for classification of an object of the 3D point cloud.

14. The system of claim 13, wherein the processor is configured to execute instructions to:
perform decoding prior to part segmentation.

15. The system of claim 10, wherein the set of global feature tokens reduces a computational complexity for object detection from quadratic to linear.

16. The system of claim 10, wherein the point cloud data is received from one or more distance measurement sensors.

17. A non-transitory computer readable storage medium having embodied thereon a program, wherein the program is executable by a processor to perform a method of object detection and part segmentation, the method comprising:
generating a three-dimensional (3D) point cloud including a plurality of points in a volume of a space of the point cloud based on receiving point cloud data;
initially obtaining, with a global transformer, a set of global feature tokens to model global context of the 3D point cloud and local feature points of the 3D point cloud;
enforcing with the global transformer an attention mechanism information flow across the set of global feature tokens and local feature points including a global to local cross-attention (CA) to update the set of global feature tokens by aggregating local information from the local feature points to the set of global feature tokens via cross attention; and
generating, with the global transformer that is utilized for object detection and part segmentation, a set of new global feature tokens and new local feature points with modeled global context information based on the attention mechanism information flow.

18. The non-transitory computer readable storage medium of claim 17, wherein the set of global feature tokens are initialized as corners of a tightest bounding box of the 3D point cloud.

19. The non-transitory computer readable storage medium of claim 17, wherein enforcing with an attention mechanism information flow across the set of global feature tokens and local feature points comprises:
the global to local cross-attention (CA) operation to update the set of global feature tokens by aggregating local information from the local feature points to the set of global feature tokens via cross attention;
a global self-attention (SA) operation to exchange information between the set of global feature tokens via self-attention; and
a local to global cross-attention operation to update local features by propagating global information from the set of global feature tokens to the local feature points via cross attention.

20. The non-transitory computer readable storage medium of claim 17, the method further comprising:
applying global average pooling (GAP) separately to both of the new global feature tokens and new local feature points to generate pooled local and global feature vectors; and
concatenating the pooled local and global feature vectors to generate a result.

* * * * *